United States Patent
Farsiu et al.

(10) Patent No.: US 9,940,722 B2
(45) Date of Patent: Apr. 10, 2018

(54) SEGMENTATION AND IDENTIFICATION OF CLOSED-CONTOUR FEATURES IN IMAGES USING GRAPH THEORY AND QUASI-POLAR TRANSFORM

(71) Applicant: Duke University, Durham, NC (US)

(72) Inventors: Sina Farsiu, Durham, NC (US); Stephanie J. Chiu, Durham, NC (US); Joseph A. Izatt, Raleigh, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 14/762,442

(22) PCT Filed: Jan. 27, 2014

(86) PCT No.: PCT/US2014/013243
§ 371 (c)(1),
(2) Date: Jul. 21, 2015

(87) PCT Pub. No.: WO2014/117108
PCT Pub. Date: Jul. 31, 2014

(65) Prior Publication Data
US 2015/0371400 A1 Dec. 24, 2015

Related U.S. Application Data

(60) Provisional application No. 61/756,527, filed on Jan. 25, 2013.

(51) Int. Cl.
*G06T 7/12* (2017.01)
*G06T 7/00* (2017.01)
(Continued)

(52) U.S. Cl.
CPC .............. *G06T 7/0083* (2013.01); *G06T 3/00* (2013.01); *G06T 5/00* (2013.01); *G06T 7/0012* (2013.01);
(Continued)

(58) Field of Classification Search
CPC . G06T 2207/10101; G06T 2207/20072; G06T 2207/30041; G06T 3/00;
(Continued)

(56) References Cited

U.S. PATENT DOCUMENTS

| | | |
|---|---|---|
| 5,040,229 A | 8/1991 | Lee et al. |
| 2001/0031078 A1 | 10/2001 | Doane |

(Continued)

FOREIGN PATENT DOCUMENTS

| | | |
|---|---|---|
| KR | 10-2013-0000023 A | 1/2013 |
| WO | 2005-106786 A1 | 11/2005 |

OTHER PUBLICATIONS

Stephanie J. Chiu, Cynthia A. Toth, Catherine Bowes Rickman, Joseph A. Izatt, and Sina Farsiu, "Automatic Segmentation of Cloaed-contour Features in Ophthalmic Images Using Graph Theory and Dynamic Programming", Published Apr. 26, 2012, Optical Society of America.*

(Continued)

*Primary Examiner* — Siamak Harandi
(74) *Attorney, Agent, or Firm* — Olive Law Group, PLLC

(57) ABSTRACT

Segmentation and identification of closed-contour features in images using graph theory and quasi-polar transform are disclosed. According to an aspect, a method includes representing, in a rectangular domain, an image including a feature of interest. Further, the method includes determining a point within the feature of interest. The method also includes transforming the image of the feature from the rectangular domain to a quasi-polar domain based on the point. The quasi-polar domain is represented as a graph of nodes connected together by edges. The method also includes graph cutting the quasi-polar domain to identify the boundary of the feature of interest in the image.

24 Claims, 13 Drawing Sheets

(51) Int. Cl.
  *G06T 3/00* (2006.01)
  *G06T 5/00* (2006.01)
  *G06T 7/162* (2017.01)
(52) U.S. Cl.
  CPC ............... *G06T 7/12* (2017.01); *G06T 7/162* (2017.01); *G06T 2207/10056* (2013.01); *G06T 2207/10101* (2013.01); *G06T 2207/20072* (2013.01); *G06T 2207/30041* (2013.01)
(58) Field of Classification Search
  CPC ....... G06T 5/00; G06T 7/0012; G06T 7/0083; G06T 7/0093; G06T 7/12
  See application file for complete search history.

(56) References Cited

U.S. PATENT DOCUMENTS

| | | | |
|---|---|---|---|
| 2006/0050991 | A1 | 3/2006 | Lee et al. |
| 2007/0086647 | A1 | 4/2007 | Grady |
| 2008/0019587 | A1 | 1/2008 | Wilensky et al. |
| 2008/0030497 | A1 | 2/2008 | Hu et al. |
| 2009/0060332 | A1 | 3/2009 | Knapp |
| 2010/0202677 | A1 | 8/2010 | Imamura et al. |
| 2011/0032533 | A1* | 2/2011 | Izatt .................. G01B 11/2441 356/497 |

OTHER PUBLICATIONS

Arthur V. Cideciyan, "Registration of Ocular Fundus Images, An Algorithm Using Cross-Correlation of Triple Invariant Image Descriptors", Jan./Feb. 1995, IEEE Engineering in Medicine and Biology, pp. 52-58.*
PCT Preliminary Report on Patentability and Written Opinion dated May 8, 2014 for related PCT International Application No. PCT/US2014/013243.
Baja et al., Discrete 3D tools applied to 2D grey-level images, Spring 2005, pp. 229-236.
Bellman, On a Routing Problem, Richard Bellman, vol. XVI, No. 1, The RAND Corporation, pp. 87-90, 1957, U.S.
Dijkstra, A Note on Two Problems in Connexion with Graphs, Cambridge University Press, 1897, vol. 13, p. 26-8, U.K.
Elias et al., A Note on the Maximum Flow Through a Network, IRE Transactions on Information Theory, 1956.
Fabritius et al., Automated Segmentation of the Macula by Optical Coherence Tomography, Optics Express, vol. 17, No. 18, Aug. 31, 2009, U.S.
Farsiu et al., Fast Detection and Segmentation of Drusen in Retinal Optical Coherence Tomography Images, Ophthalmic Technologies XVIII, Proc. of SPIE vol. 6844, 2008, U.S.
Fernandez et al., Automated Detection of Retinal Layer Structures on Optical Coherence Tomography Images, Optics Express, vol. 13, No. 25, Dec. 12, 2005, U.S.
Garvin et al., Automated 3-D Intraretinal Layer Segmentation of Macular Spectral-Domain Optical Coherence Tomography Images, IEEE Transactions on Medical Imaging, vol. 28, No. 9, Sep. 2009, U.S.
Graph cuts segmentation—medical images, Jacquot et al., IEEE, 978-0-7695-3122, 2008, pp. 631-635.
Haeker et al., Automated Segmentation of Intraretinal Layers from Macular Optical Coherence Tomography Images, Society of Photo-Optical Instrumentation Engineers, 2007, U.S.
Intraretinal layer segmentation—search., Gavin et al., IEEE, 0278-0062, 2008, pp. 1495-1505.
Intra-retinal segmentation—images, Mishra et al., Optic Express 23719, Published Dec. 11, 2009, pp. 1-10.
Ishikawa et al., Macular Segmentation with Optical Coherence Tomography, Investigative Ophthalmology & Visual Science, vol. 46, No. 6, Association for Research in Vision and Ophthalmology, Jun. 2005, U.S.
Lu et al., Automated Layer Segmentation of Optical Coherence Tomography Images, IEEE Transactions on Biomedical Engineering, vol. 57, No. 10, Oct. 2010, U.S.
Mishra et al., Intra-Retinal Layer Segmentation in Optical Coherence Tomography Images, Optics Express, vol. 17, No. 26, Dec. 21, 2009, U.S.
Niemeijer et al., Vessel Segmentation in 3D Spectral OCT Scans of the Retina, Medical Imaging 2008, Image Processing, Proc. of SPIE, vol. 6914, 2008, U.S.
Non-Final Office Action received in U.S. Appl. No. 13/010,448 dated Jan. 2, 2014.
Notice of Allowance received in U.S. Appl. No. 13/010,448 dated May 13, 2014.
Notice of Allowance received in U.S. Appl. No.14/337,215 dated Dec. 23, 2015.
Notice of Allowance received in U.S. Appl. No. 15/049,103 dated Oct. 10, 2016.
Office Action received in U.S. Appl. No. 14/337,215 dated May 12, 2015.
Office Action received in U.S. Appl. No. 14/337,215 dated Nov. 5, 2014.
Office Action received in U.S. Appl. No. 15/049,103 dated Jul. 5, 2016.
Otsu, A Threshold Selection Method from Gray-Level Histograms, IEEE Transactions on Systems, Man, and Cybernetics, vol. SMC-9, No. 1, Jan. 1979, U.S.
Shi et al., Normalized Cuts and Image Segmentation, IEEE Transactions on Pattern Analysis and Machine Intelligence, vol. 22, No. 8, Aug. 2000, U.S.
Takeda et al., Kernel Regression for Image Processing and Reconstruction, IEEE Transactions on Image Processing, vol. 16, No. 2, Feb. 2007, U.S.
The Age-Related Eye Disease Study Research Group, The Age-Related Eye Disease Study System for Classifying Age-Related Macular Degeneration From Stereoscopic Color Fundus Photographs: The Age-Related Eye Disease Study Report No. 6, Elsevier Service Inc., vol. 132, No. 5, 2001, U.S.
Tolliver et al., Unassisted Segmentation of Multiple Retinal Layers via Spectral Rounding, Presented in ARVO 2008 Annual Meeting, Fort Lauderdale, Florida, U.S., Apr. 2008.
Marshall, A Theorem on Boolean Matrices, Computer Associates, Inc., Woburn, Massachusetts, U.S.
Yazdanpanah et al., Segmentation of Intra-Retinal Layers from Optical Coherence Tomography Images Using an Active Contour Approach, IEEE, 2010, U.S.

* cited by examiner

SEGMENTATION AND IDENTIFICATION OF CLOSED-CONTOUR FEATURES IN IMAGES USING GRAPH THEORY AND QUASI-POLAR TRANSFORM

CROSS REFERENCE TO RELATED APPLICATIONS

This application is a 35 USC 371 application of International PCT Patent Application No. PCT/US2014/013243, filed on Jan. 27, 2014 and titled SEGMENTATION AND IDENTIFICATION OF CLOSED-CONTOUR FEATURES IN IMAGES USING GRAPH THEORY AND QUASI-POLAR TRANSFORM, which claims priority to U.S. Provisional Patent Application No. 61/756,527, filed Jan. 25, 2013 and titled SYSTEMS AND METHODS FOR SEGMENTATION OF CLOSED-CONTOUR STRUCTURES IN IMAGES USING GRAPH THEORY, DYNAMIC PROGRAMMING, AND QUASI-POLAR TRANSFORM; all of the contents of which are hereby incorporated by reference herein in their entireties.

GOVERNMENT RIGHTS NOTICE

This invention was made with government support under grant numbers R01-EY022691 and R21-EY021321, awarded by the National Institutes of Health. The government may have certain rights in the invention.

TECHNICAL FIELD

The presently disclosed subject matter relates to imaging and image processing, and more specifically, to systems and methods for segmentation and identification of closed-contour features in images using graph theory and quasi-polar transform.

BACKGROUND

Fast, accurate, and objective detection of disease imaging biomarkers is crucial for the study and diagnosis of ophthalmic diseases. In recent years, much work has been focused on the automatic segmentation of retinal and corneal layer structures seen on spectral domain optical coherence tomography (SDOCT) images. OCT systems have been equipped with segmentation software, which have been mainly targeted to measure the nerve fiber layer and the total retinal thicknesses.

Aside from layered structures, there is a need for automatically segmenting closed-contour features in ophthalmic images and other types of images. Examples of closed-contour anatomical and pathological structures include such as cysts seen on SDOCT images of diabetic or pediatric retina with edema, and retinal pigment epithelium (RPE) cells seen on confocal microscopy fluorescence images of flat-mounted mouse retina. Previous techniques, including active contours, have been demonstrated to segment closed-contour features; however, such techniques have limited accuracy and cannot be optimally extended to linear features, such as retinal layers.

In view of the foregoing, there is a need for improved techniques and systems for segmenting and identifying closed-contour features in images.

BRIEF SUMMARY

Disclosed herein are segmentation and identification of closed-contour features in images using graph theory and quasi-polar transform. According to an aspect, a method includes representing, in a rectangular domain, an image including a feature of interest. Further, the method includes determining a point within the feature of interest. The method also includes transforming the image of the feature from the rectangular domain to a quasi-polar domain based on the point. The quasi-polar domain is represented as a graph of nodes connected together by edges. The method also includes graph cutting the quasi-polar domain to identify the boundary of the feature of interest in the image.

BRIEF DESCRIPTION OF THE SEVERAL VIEWS OF THE DRAWINGS

The foregoing aspects and other features of the present subject matter are explained in the following description, taken in connection with the accompanying drawings, wherein:

FIG. 6($b$) shows $B_c$, the cropped pilot estimate image;

FIG. 10($b$) shows an image of fully automatically segmented retinal layers via layer GTDP, and segmented intraretinal cysts via closed-contour GTDP;

FIG. 12($b$) shows an image of a pilot estimate of the cone in FIG. 12($a$);

FIGS. 12($c$,$d$) show polar transformation of ($a$) and ($b$), respectively;

FIGS. 12($e$,$f$) show images ($c$) and ($d$) column-wise shifted until the pilot estimate in ($d$) was flat, also the quasi-polar transform of ($a$) and ($b$);

FIG. 12($g$) shows an image of segmentation of ($e$) using GTDP. FIG. 12($h$) Inverse quasi-polar transformation of the segmentation in ($g$) back into the Cartesian domain;

DETAILED DESCRIPTION

Figure 1:
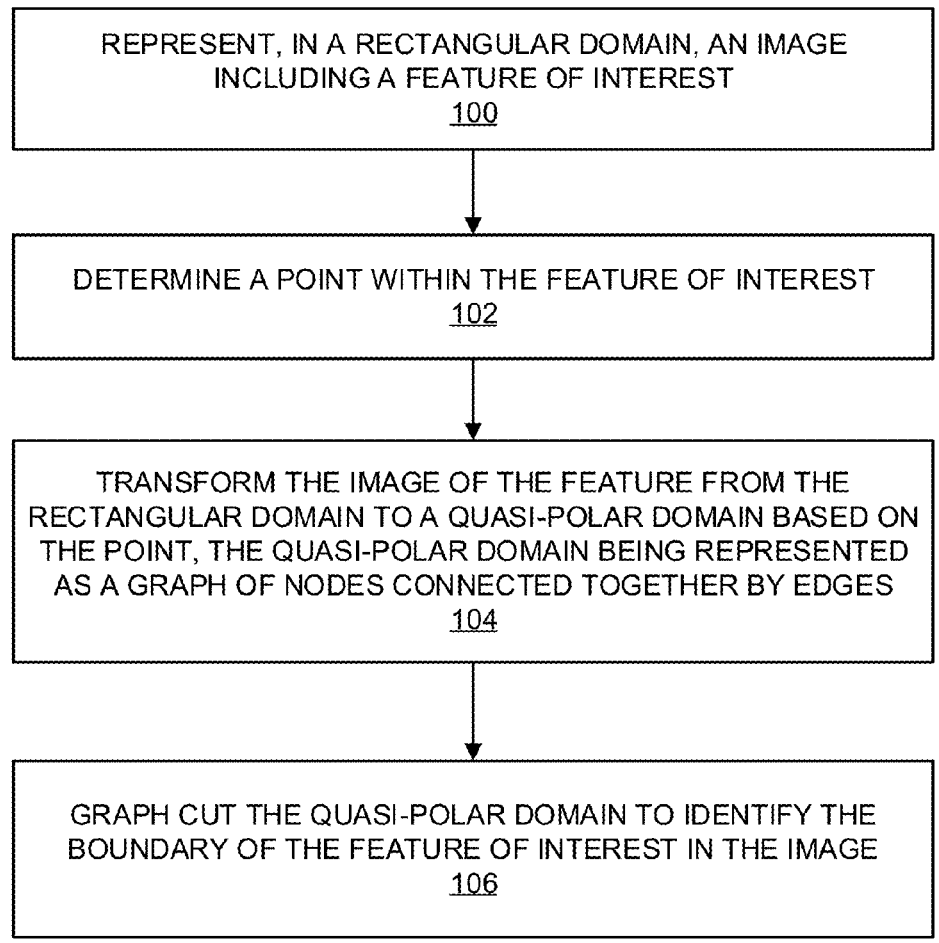
FIG. 1 is a flow chart of an example method of identifying a closed-contour feature in an image using a quasi-polar transform in accordance with embodiments of the present disclosure.

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

Unless otherwise defined, all technical terms used herein have the same meaning as commonly understood by one of ordinary skill in the art to which this disclosure belongs.

As referred to herein, the term "closed-contour feature" may refer to an image feature having a contour line that surrounds the entirety of the image feature or a portion the image feature in a closed path. Example closed-contour features in images include, but are not limited to, tumors, cysts, RPE cells, and photoreceptors.

As referred to herein, the term "substantially closed-contour feature" may refer to an image feature having a contour line that substantially surrounds the entirety of the image feature or a portion of the image feature in a nearly closed path. The contour line may form a "C" shape or surround a majority of the image feature.

As referred to herein, the term "quasi-polar transform" may refer to the projection of a close-contour n-dimensional object in one space or domain to another n-dimensional space in which the object is represented as an open-contoured feature. For example, a quasi-polar transform may project a closed-contour n-dimensional object (e.g., an ellipsoid) in the Cartesian domain to a quasi-polar domain in which the object is represented as a curve or a straight line.

In many examples disclosed herein, systems and methods are applied to closed-contoured features, although these systems and methods may be similarly applied to substantially closed-contoured features. In these instances, the resulting segmentation may be closed. For example, the segmentation for "C" may look like an "O".

The present subject matter discloses systems and methods for segmenting and identifying closed-contour features in images using graph theory, dynamic programming, and quasi-polar transform. The closed-contour images may initially be represented in a rectangular domain (e.g., Cartesian domain). Subsequently, a line may be defined that surrounds the feature of interest. A centroid of a shape defined by the line may also be defined. The image may be transformed from the rectangular domain to a quasi-polar domain based on the centroid. The image in the quasi-polar domain may be represented as a graph of nodes connected by edges. Nodes may be added to the nodes along first and second sides of the graph. The added nodes may have edge weights less than the nodes along the first and second sides of the graph. Start and end points may be assigned to any of the added nodes along the first and second sides, respectively. Subsequently, a suitable graph cutting technique may be applied between the start and end points for identifying the feature in the image. It should be understood that although the disclosed systems and methods are applied to ocular images, the systems and methods may be applied to any images including features to be segmented or identified. Further, while the disclosed systems and methods are primarily described herein for segmenting retinal layers in SDOCT images, the systems and methods disclosed herein may also be generally applied for segmenting any layered structure in images of any imaging modality.

In accordance with embodiments of the present subject matter, a closed-contour feature of interest may be represented as a line in a "quasi-polar" domain. An image of the closed-contour feature in a rectangular domain may be transformed to the quasi-polar domain as demonstrated by techniques disclosed herein. The feature of interest may have an arbitrary shape defined by a line in the image that surrounds the feature. A quasi-polar transform as disclosed herein may be applied to the rectangular domain to transform the arbitrary shape into a layer. The quasi-polar transform may be include the following example steps: a polar-transform followed by a flattening step required to map the closed-contour shape into a flat layer. The parameters for flattening may be attained from a pilot estimate of the feature of interest. In an example, flattening may be achieved by suitably shifting pixels on the transformed image until the feature of interest is substantially flat. Once a closed-contour feature is flattened, the feature may be segmented as if it were a layered feature or structure. It is noted that a pilot estimate closer to the actual feature may yield flatter quasi-polar transformed features. However, due to the robustness of the segmentation technique, the mapped feature may not be needed to be a perfectly flat layer. Thus, only a rough estimate of the feature of interest is needed to attain sufficient flattening. This rough estimate can either be generated automatically (automatic segmentation), or it can be provided by user (semi-automatic segmentation). Subsequently, an inverse quasi-polar transform may be applied to map the segmented line into the rectangular domain (e.g., Cartesian domain).

FIG. 1 illustrates a flow chart of an example method of identifying a closed-contour feature in an image using a quasi-polar transform in accordance with embodiments of the present disclosure. The method of FIG. 1 may be implemented by any suitable computer, other programmable data processing apparatus, or other devices configured to cause a series of operational steps to be performed on the computer for implementing the method. Similarly, other methods and techniques described herein may be implemented by any such devices.

Referring to FIG. 1, the method includes representing, in a rectangular domain, an image including a feature of interest (block 100). For example, the image may be an SDOCT B-scan showing multiple features of interest. The features of interest may be, for example, closed-contour features such as tumors, cysts, RPE cells, and photoreceptors. As an example, FIG. 2A shows a zoomed in portion of an SDOCT image of a retinal cyst of a diabetic patient. The retinal cyst shown in FIG. 2A is a closed-contour feature (the darkened area positioned in about the center of the image). The image of FIG. 2A may be suitably represented in the Cartesian domain.

The method of FIG. 1 includes determining a point within the feature of interest (block 102). Continuing the aforementioned example, FIG. 2B shows the image of FIG. 2A with an estimated boundary 200 of the cyst drawn thereon. The estimated boundary 200 is also referred to herein as a pilot estimate of the feature of interest. It is noted that the point may be a centroid within a shape defined by the estimated boundary. Alternatively, the point may be about centered within the shape or any other suitable position within the shape defined by the estimated boundary.

The method of FIG. 1 includes transforming the image of the feature of interest from the rectangular domain to a quasi-polar domain based on the point (block 104). The quasi-polar domain can be represented as a graph of nodes connected together by edges. The nodes may correspond to a pixel of the image. In the graph, the links connecting the nodes are referred to herein as "edges." A set of connected edges form a pathway for one to travel across the graph for defining or identifying a feature of interest. Weights can be calculated and assigned to individual edges to create path preferences. To travel across the graph from a start node to an end node, the preferred path is the route in which the total weight sum is at a minimum. This resulting path is a graph cut which segments one region from another. For example, a boundary of a feature of interest corresponds to the preferred paths (cuts) on an SDOCT B-scan.

An important aspect of accurately cutting a graph is to assign the appropriate edge weights. Metrics for varying weight values include functions of distances between pixels or differences between intensity values. As long as the feature to be segmented has characteristics unique to its surroundings, low weights can be assigned to the borders of that feature to distinguish it from the rest of the image.

Once appropriate weights are assigned to the edges, computationally efficient techniques such as, for example, but not limited to, Dijkstra's algorithm can be used to determine the lowest weighted path of a graph between arbitrary endpoints. Although many of the examples described herein utilize Dijkstra's algorithm, it is emphasized that any other suitable shortest path algorithm which utilize graph theory and adjacency matrices (e.g., utilize the max-flow-min-cut technique) may also be suitable for segmenting or cutting an image in accordance with embodiments of the present disclosure.

FIG. 2C shows an image of a quasi-polar domain representation of the image shown FIG. 2B. The image shown in FIG. 2C is the image that results from transforming the image in FIG. 2B in the rectangular domain to the quasi-polar domain.

Additional description for calculating and assigning weights, and graph cutting may be found in U.S. Patent Application Publication No. 2011/0182517 A1, titled "Segmentation and Identification of Layered Structures in Images," the content of which is incorporated herein by reference.

Nodes may be added to the graph adjacent to nodes along first and second sides of the graph. The added nodes may have edge weights less than the nodes along the first and second sides of the graph. Further, start and end points may be assigned to any of the added nodes along the first and second sides, respectively. As an example, endpoint initialization may be based on the assumption that the layer to be segmented extends across the entire width of the image. Since Dijkstra's algorithm prefers minimum-weighted paths, an additional column of nodes is added to both sides of the image with arbitrary intensity values and minimal weights $w_{min}$ assigned to edges in the vertical direction. Note that, $w_{min}$ is significantly smaller than any of the non-zero weights in the adjacency matrix of the original graph. In doing so, the nodes in the newly added columns maintain their connectivity, and the graph cut is able to traverse in the vertical direction of these columns with minimal resistance. This allows for the start and end nodes to be assigned arbitrarily in the newly added columns, since the graph cut will move freely along these columns prior to moving across the image in the minimum-weighted path.

Figure 2:
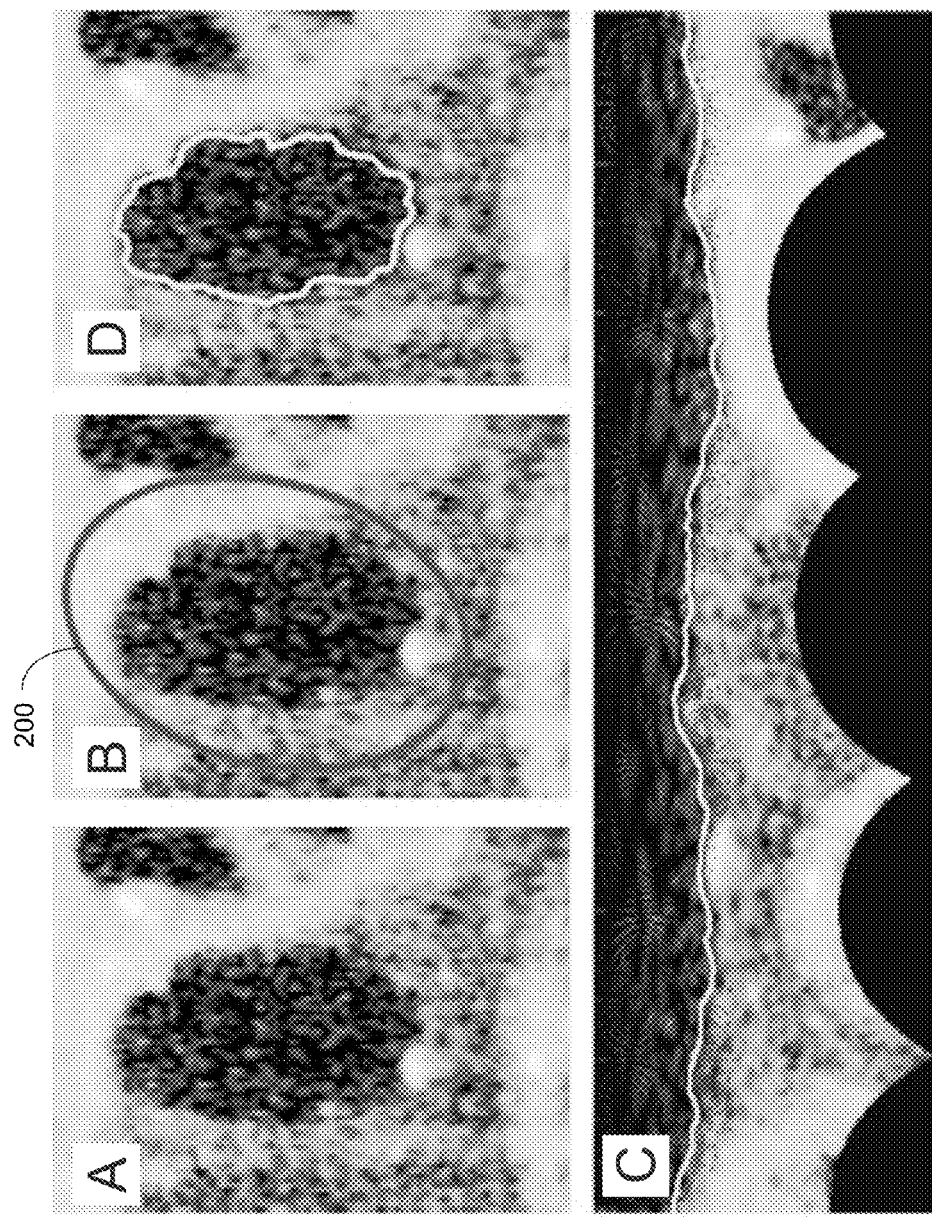
FIG. 2A shows a zoomed in portion of an SDOCT image of a retinal cyst of a diabetic patient.
FIG. 2B shows the image of FIG. 2A with an estimated boundary of the cyst drawn thereon.
FIG. 2C shows an image of a quasi-polar domain representation of the image shown FIG. 2B.

The method of FIG. 1 includes graph cutting between the start and end points to define a path for identifying the feature in the image (block 106). For example, given a graph with weights associated to edges, segmentation includes cutting the graph by determining a minimum weighted path that connects two endpoints, such as, by use of the Dijkstra algorithm or any other suitable algorithm. Once the image is segmented, the additional nodes can be removed, leaving an accurate graph cut without endpoint initialization error. The resulting pathway may define the actual boundary of the feature of interest. Particularly, the pathway may match the contour line that surround the entirety of the image feature, or cyst as shown in the example of FIG. 2.

In an alternative example of graph cutting, a single node may be added to each side of the graph. Particularly, each node may be added adjacent to the nodes along its respective side of the graph. The weights connecting these new nodes to the nodes of the image may be of any size as long as they are equal to each other. Subsequently, a suitable graph cutting technique may be implemented for graph cutting between the nodes added to each side of the graph. In this way, the feature of interest in the image may be identified.

Subsequently, an inverse quasi-polar transform may be applied to the image shown in FIG. 2C to map the segmented line into the rectangular domain (e.g., Cartesian domain). By transforming the segmentation result back into the rectangular domain, a more accurate segmentation of a cyst or other feature of interest may be obtained.

In accordance with embodiments of the present disclosure, system and methods disclosed herein may be used to segment retinal cysts on SDOCT images and RPE cells on confocal fluorescence microscopy images. For retinal cysts, a layer segmentation algorithm may be utilized to isolate layers of interest. Extended local minima may be used to initialize rough estimates of the cyst locations. Using these pilot estimates, the cysts may be mapped to the quasi-polar domain. The cysts may subsequently be segmented in accordance with the present disclosure.

Figure 3A:
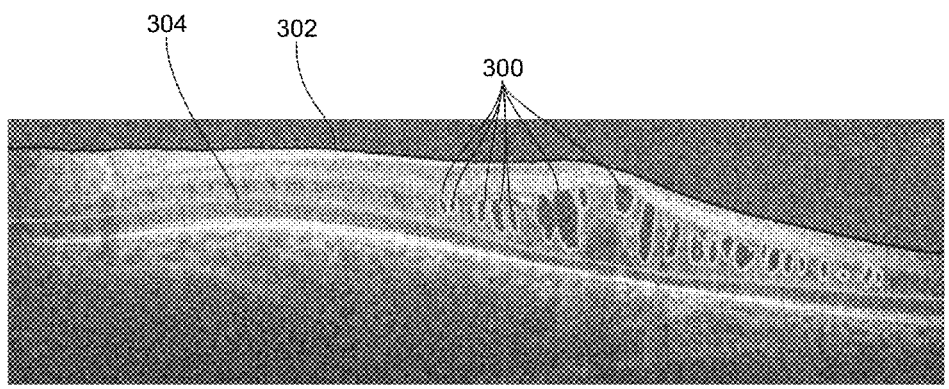
FIG. 3A shows an image of automatically segmented cysts in an unsummed, retinal SDOCT image of a premature infant eye with macular edema.
Figure 3B:
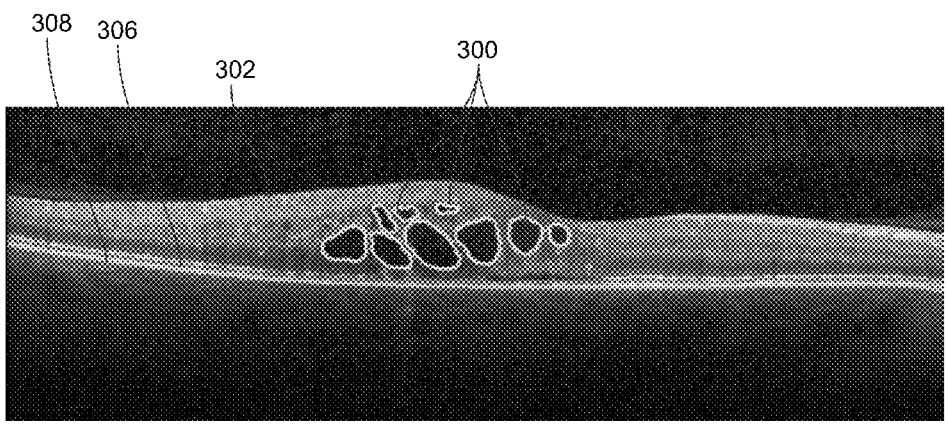
FIG. 3B shows a summed retinal SDOCT image of an eye with diabetic macular edema.

FIG. 3A shows an image of automatically segmented cysts in an unsummed, retinal SDOCT image of a premature infant eye with macular edema. FIG. 3B shows a summed retinal SDOCT image of an eye with diabetic macular edema. Lines 300 were generated in accordance with embodiments of the present disclosure for indicating automatically segmented cysts. The internal limiting membrane (indicated by line 302), outer plexiform-outer nuclear layer boundary (indicated by line 304), outer segment-retinal pigment epithelium (indicated by line 306), and Bruch's membrane (indicated by line 308) were first segmented using a layer graph theory and dynamic programming (GTDP) technique as disclosed herein. Subsequently, the cysts were segmented using a closed-contour GTDP technique as disclosed herein.

Figure 4:
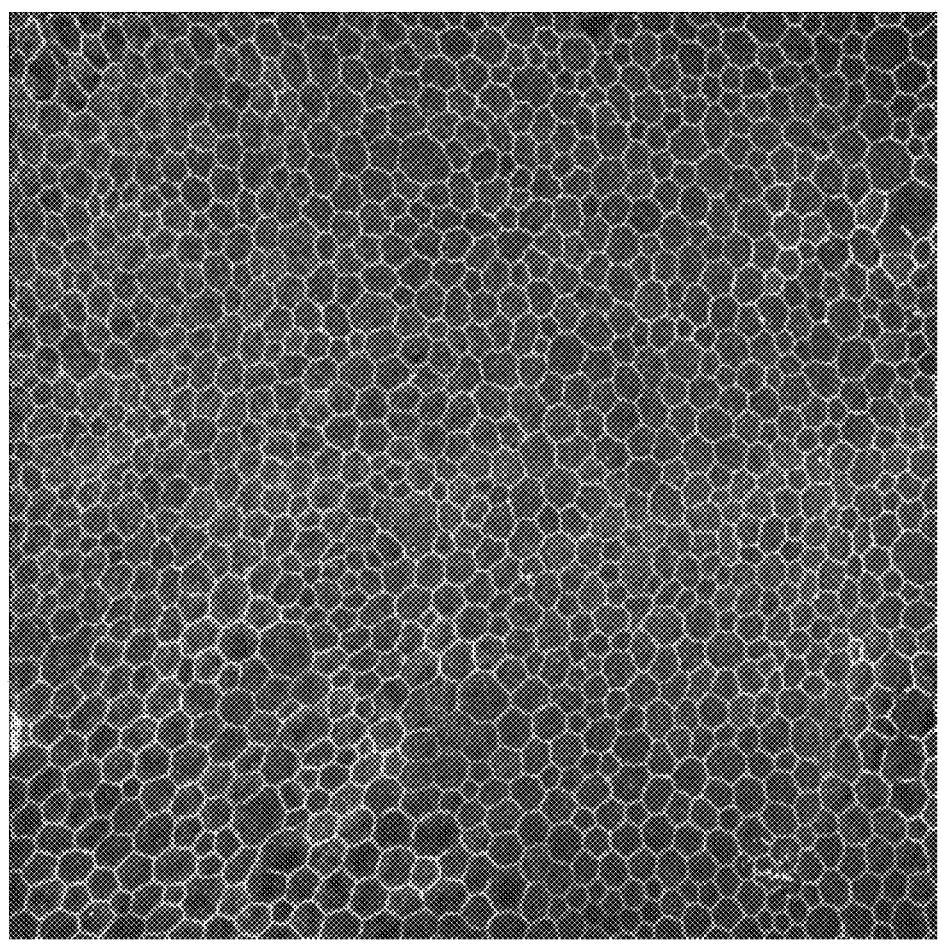
FIG. 4 shows an image of automatically segmented RPE cells in a flat-mounted AMD mouse model.

To segment RPE cells in flat-mounted images a similar technique to the closed-contour GTDP technique may be used for segmenting cysts. FIG. 4 shows an image of automatically segmented RPE cells in a flat-mounted AMD mouse model.

In accordance with embodiments of the present disclosure, example steps for segmenting closed-contour features via GTDP include: (1) generate pilot estimate of the structure (or feature of interest); (2) transform image to quasi-polar domain; (3) segment layered structure using GTDP; and (4) transform layer back to Cartesian domain.

Pilot Structure Estimation

The first step is to attain pilot estimates of all structures to segment. These estimates may contain information about both the location and shape of the structures. Structure localization can prevent the algorithm from confusing the target structure with similarly-shaped extraneous features, while shape estimation results in a more accurate quasi-polar transform, as will be discussed in further detail herein.

For a grayscale image $I_c^{all} \epsilon \Re^{F \times G}$ in the Cartesian domain, the pilot estimates can be represented as a binary image $B_c^{all}$, where:

$$B_c^{all}(z) = \begin{cases} 1, & \text{if } z \in \text{ pilot estimate} \\ 0, & \text{otherwise} \end{cases}, \forall z \quad (1)$$

and z=(i, j) denotes the pixel at the $i^{th}$ row and $j^{th}$ column of the image. Many different techniques such as thresholding, contours, local minima, or the multiscale generalized likelihood ratio test can be used to attain this estimate. To isolate a single structure, $I_c^{all}$ and $B_c^{all}$ can be cropped to smaller image blocks ($I_c$ and $B_c$), both $\epsilon \Re^{M \times N}$ where M<F and N<G.

Image Transformation into the Quasi-Polar Domain

Figure 5:
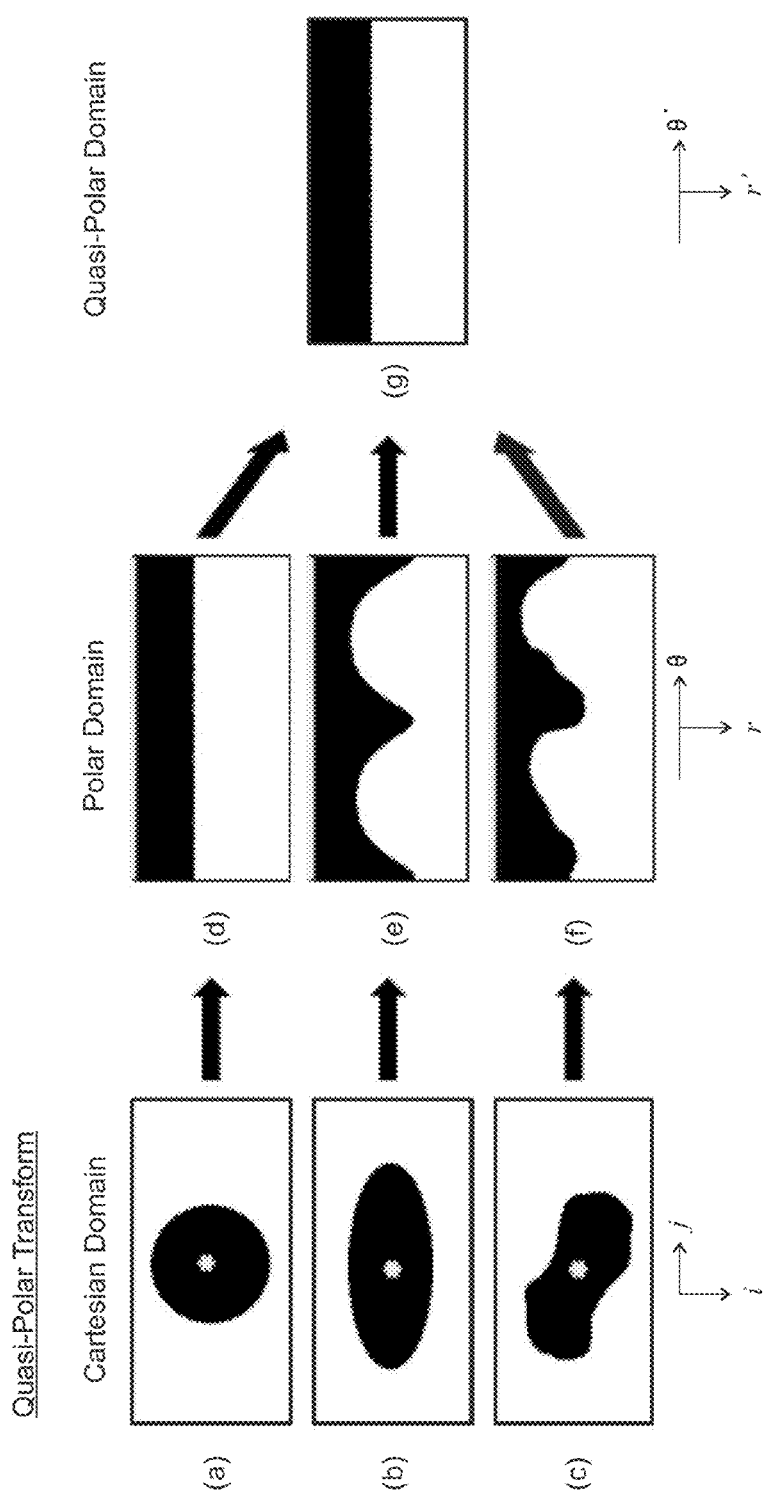
FIG. 5($a$-$c$) illustrates a diagram depicting a circle, an oval, and an arbitrary shape in the Cartesian domain.

In its simplest form, the quasi-polar transform can be described by a polar transform followed by a flattening step. FIG. 5 illustrates a diagram depicting a circle, an oval, and an arbitrary shape in the Cartesian domain (FIG. 5(a-c)). These shapes are transformed into the polar domain (FIG. 5(d-f)). Information about the shape of the pilot estimate may then be used to flatten the structure into a line in the quasi-polar domain (FIG. 5(g)). Once transformed into the quasi-polar domain, the structure can be segmented using a suitable GTDP technique.

It can also be observed from FIG. 5 that a simple polar transform is sufficient to map closed-contour shapes (FIG. 5(a-c), wherein the asterisk in within each shape designates a location of the centroid for the respective shape) into layered structures (FIG. 5(d-f) where the centroid becomes a line at the top of each image in the polar domain). In FIG. 5(d-f), the line is flattened in the quasi-polar domain. Motivation for a further transformation into the quasi-polar domain (FIG. 5(g)) stems from the tendency for shorter geometric paths to be found when using the GTDP technique, especially in low signal-to-noise ratio (SNR) imaging scenarios. The result is a transformation of any closed-contour shape in the Cartesian domain into a line in the quasi-polar domain. This is due to the observation that a cut (segmentation) with fewer traversed nodes often yields a lower total weight. As a result, oblong features may be disadvantaged since their paths in the polar domain are longer than the shortest geometric path (FIG. 5(e,f)). By performing an extra flattening step, the path of the oblong structure now reflects the shortest geometric distance.

The quasi-polar transform may be implemented using the following three steps:

1) Map pixels from the Cartesian domain into the polar domain based on their distance and angle from a reference pixel and axis, respectively. The reference pixel $z_{ref}$ can be any single pixel, where $B_c(z_{ref})=1$; however ideally $z_{ref}$ lies at the center of the closed-contour feature to facilitate its flatness in the polar domain. The centroid of the pilot estimate is therefore a good choice for $z_{ref}$, where:

$$z_{ref} = (i_{ref}, j_{ref}) \frac{1}{K} \sum_{k=1}^{K} z_k : \quad (2)$$

for the set of K pixels $\{z_k\}_{k=1}^{K}$ where $B_c(z_k)=1$. Example binary images ($B_c$) are shown in FIG. 5(a-c) with $z_{ref}$ marked as a yellow asterisk and the reference axis defined as the j-axis. Using the Cartesian binary image $B_c$ and Eq. (3), generate the polar-transformed binary image $B_P$ (FIG. 5(d-f)), where $B_P$ (r,θ) denotes the pixel in $B_P$ with a radius r and angle θ from the reference pixel and axis, respectively. Then, assuming a unit step size, $B_P \epsilon \Re^{R \times \Theta}$ where R=max(r) and Θ=361.

$B_P(r, \theta) = B_c(i,j)$, $0 < r \leq \max(\sqrt{(i-i_{ref})^2 + (j-j_{ref})^2})$, $\forall i, j$ $0° < \theta \leq 360°$, $i = r \sin(\theta) \, i_{ref} = j + \cos(\theta) \, j_{ref}$ \quad (3)

2) Find a function r=f(θ) that best estimates the boundary between the background and the pilot estimate in $B_P$. This can be achieved by taking the vertical gradient of the image, or by using the GTDP layer segmentation technique described herein with edge weights determined by the vertical gradient of $B_P$.

3) Generate the quasi-polar binary image $B_q \epsilon \Re^{R \times \Theta}$ (FIG. 5(g)), where for all columns $\{b_{pk}\}_{k=1}^{\Theta}$ in $B_P$, the $k^{th}$ column $b_{qk}$ in $B_q$ is determined by:

$$b_{qk} = C b_{pk}; \text{ where } C \in \mathcal{R}^{\Theta \times \Theta} \text{ and} \quad (4)$$

$$C(i, j) = \begin{cases} 1, & \text{if } i = \left(\frac{1}{\Theta} \sum_{j=1}^{\Theta} f(i)\right) f(j) - j \\ 0, & \text{otherwise} \end{cases},$$

Use the exact transformation mapping $B_c \rightarrow B_q$ (Steps 2 and 4) to then transform the grayscale image $I_c$ into its quasi-polar equivalent, $I_q$.

Since Step (3) flattens the pilot estimate instead of the structure itself, in general the structure is not perfectly flat in $I_q$. This also implies that a pilot estimate shape closer to the actual structure results in a flatter structure in the quasi-transform domain.

Layer Segmentation Using GTDP

Once the image is transformed into the quasi-polar domain, it can be segmented using a GTDP-based automatic layer segmentation algorithm. In summary, this technique represents the image as a graph containing nodes (i.e., image pixels), and edges, which connect adjacent pixels. Weights may be to each of the edges based on a priori information about the structure to prefer paths through the structure boundaries. A GTDP technique includes automatic endpoint initialization, where an additional column is added to either side of the image with minimal vertical edge weights. The start and end nodes can then be arbitrarily defined anywhere within these two columns. Finally, any suitable optimization method that finds the minimum weighted path from the start node to the end node can be used to segment the structure.

Transformation Back into the Cartesian Domain

Once the structure is segmented in the quasi-polar domain, the segmentation information can be transformed back into the Cartesian domain by applying the inverse of Steps (1 and 3) from above.

Segmentation of Subsequent Structures

After the first structure is segmented, Steps (1-3) described above are repeated for each subsequent structure (e.g., for each individual cell or cyst). This may be achieved by either sequential segmentation of individual features, or parallelizing the segmentation to make this process more efficient.

Implementation for RPE Cell Segmentation

AMD is the leading cause of irreversible blindness in Americans older than 60 years. In a recent study, Ding et al. showed that anti-amyloid therapy protects against RPE damage and vision loss in an APOE4 mouse model of AMD. The average size and density of the cells can be used as biomarkers for disease progression. To attain these quantitative metrics, 22,495 cells were analyzed using customized semi-automatic segmentation software. To achieve a drastically faster segmentation rate, this section describes an implementation of the generalized closed-contour segmentation algorithm disclosed herein to fully automatically segment RPE cells in confocal microscopy images of flat-mounted retina of normal and AMD mouse models.

Dataset

In the following, a fully automatic segmentation method is described as tailored to a published dataset. However, the adaption of the presently disclosed method to any other dataset can be similar and straightforward. The dataset included 23 confocal microscopy fluorescence images $\{(I_c^{all})_k\}_{k=1}^{23} \in \Re^{1024 \times 1024}$ ($0.64 \times 0.64$ mm$^2$) of central RPE flat mounts from 17 mice with approximately 1000 cells per image. RPE cells were stained with a rabbit antibody against ZO-1 (40-2200, 1:100; Invitrogen) and imaged on a Nikon Eclipse C1 microscope.

Pilot Estimation of Cell Morphology

First, the intensities of the image ($I_c^{all}$) were normalized, s.t. $0 \leq I_c^{all} \leq 1$. Then, $I_c^{all}$ was smoothed using an 11×11 pixel Gaussian filter with standard deviation $\sigma$=25 pixels. Next, the extended-minima transform was computed and it was found that all minima and suppressed those with a depth less than 0.05. To generate the pilot estimate $B_c^{all}$ for all cells, $B_c^{all}$ (z)=1 was set for all points z lying within the convex hull of each minima. To localize the desired cell and its corresponding pilot estimate, cropped $I_c^{all}$ and $B_c^{all}$ to 201× 201 pixel image blocks were cropped corresponding to the largest conceivable cell size in our model. FIG. 6(a) shows $I_c$, the cropped cell image, and FIG. 6(b) (with the centroid indicated by an asterisk) shows $B_c$, the cropped pilot estimate image. Both images were centered at the $z_{ref}$ computed for the desired pilot estimate. Since $B_c$ contained other cell estimates, all pixels were set outside the desired estimate in $B_c$ to zero.

Image Transformation into the Quasi-Polar Domain

Figure 6:
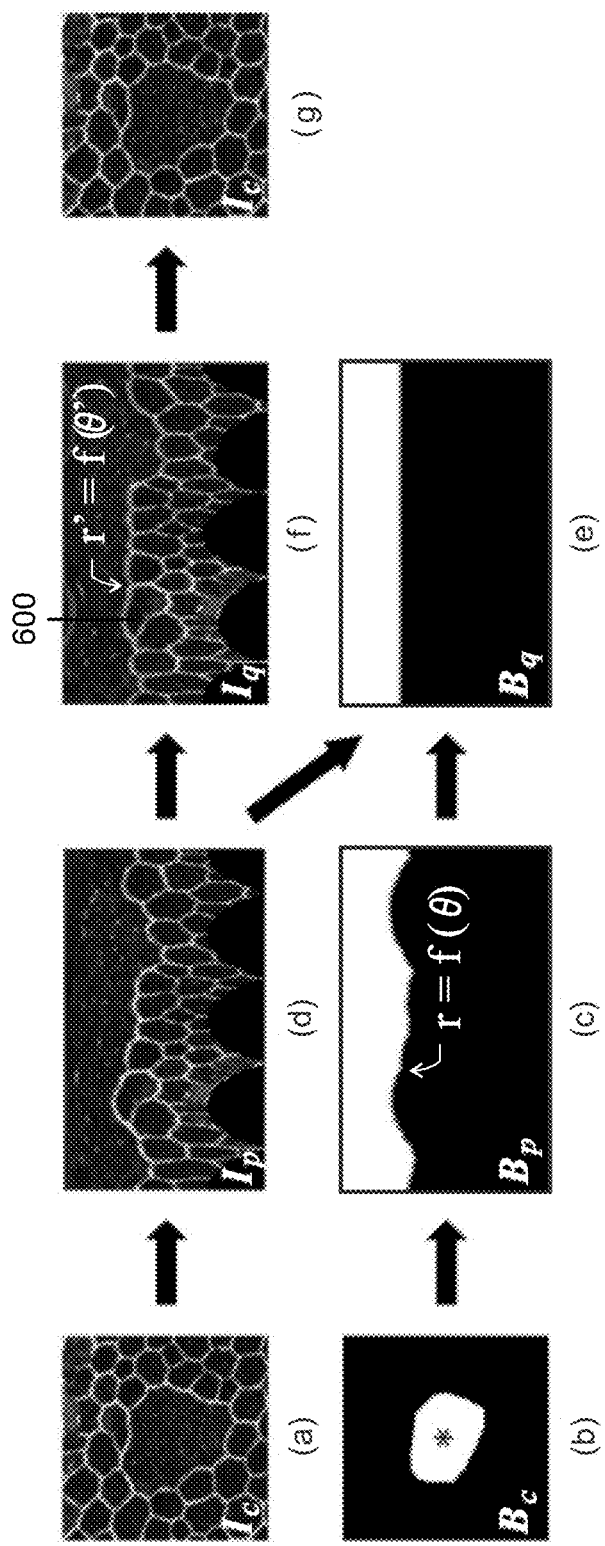
FIG. 6($a$) shows $I_c$, the cropped cell image.

Next transformed $I_c \rightarrow I_P \rightarrow I_q$ (FIG. 6(a,d,f)) were transformed by following Steps (1-3) described herein with the following implementation details:

After generating $B_P$ in Step (1), the logical OR combination of $b_{OR}=b_{p1}|b_{p\Theta}$ and set $b_{p1}=b_{p\Theta}=b_{OR}$, since $\theta_1=\theta_\Theta=0=360°$. were found.

For Step (2), the boundary in $B_P$ was segmented using the GTDP layer segmentation technique. The segmentation was smoothed using a moving average filter with a span of 1%. This smoothed cut was set as the function $r=f(\theta)$ (FIG. 6(c) where line 600 designates the cut), which provided the shape information necessary to flatten the image.

To generate the edge weights, a threshold image $T_c$, was created, where:

$$T_c(z) = \begin{cases} S_c(z), & \text{if } S_c(z) > \text{mean}(S_c) \\ 0, & \text{otherwise} \end{cases}, \forall z \quad (5)$$

and $s_c$=wiener2($I_c$) (MATLAB notation; The MathWorks, Natick, Mass.) was denoised using the Wiener filter. All connected components in $T_c$ were set smaller than 20 pixels to zero, and for all z where $B_c^{all}$ (z)=1 and $B_c$(z)=0, $T_c$(z) =−1. was set. Finally, T was transformed into its quasi-polar equivalent, T.

While FIG. 6(f) shows the resulting quasi-polar transformed cell image $I_q$, FIG. 6(e) shows the quasi-polar transformed pilot estimate. As can be seen, the transform yielded a fully flattened pilot estimate and an approximately flattened cell structure.

Cell Segmentation Using GTDP

Once the quasi-polar transformed image $I_q$ was generated, a GTDP layer segmentation framework was used to segment the cell boundary. To do so, the following three cost functions were defined:

(1) Penalize bright nodes further from the centroid to avoid segmenting multiple cells at once ($T_{q1}$ in Eq. (7)).
(2) Penalize nodes that include the pilot estimates of other cells to also avoid segmenting multiple cells at once ($T_{q2}$ in Eq. (7)).
(3) Penalize nodes that fall below the threshold criteria for $T_q$ ($T_{q1}$ in Eq. (7)).

These three cost functions were implemented using the following MATLAB (The MathWorks, Natick, Mass.) notation, where $t_q$ and $t_{qx}$ are corresponding columns in $T_q$ and $T_{qx}$, respectively, such that:

$t_{q1}=bw\text{label}(t_q 0), >$ $t_{q2}=bw\text{label}(\sim t_q|t_q=-1),$ $t_{q3}=2bw\text{label}(t_q=-1)2. \quad (6)$ These cost functions were combined such that:

$T_{q1}(T_{q1}==0)>T_{q2}(T_{q2}+0)1.5,$ $T_{q3}(T_{q3}<0)=\max(T_{q3})2, +$ $T_q = T_{q1} + T_{q3}. \quad (7)$ Finally, the edge weights were calculated using:

$w_{ab}=\text{normalize } (I_q(z_a-)I_q(z_b-),0.25)$ $\text{normalize } (T_q(z_a)+T_q(z_b),1,2)+w_{min}, \quad (8)$ where $w_{ab}$ is the weight assigned to the edge connecting pixels $z_a$ and $z_b$, and $w_{min}$=0.00001. The normalize(x, y, z) notation indicates a normalization of the values x to range from y to z.

Prior to finding the shortest path, all edges were discarded from the graph containing nodes in previously segmented cells to avoid segmenting them again. Also, the edges were excluded that allowed those cells to be included within a newly segmented cell. Then, the minimum-weighted path p was found using Dijkstra's method, where $r'=p(\theta')$ and $\theta'$ represent the row and column axes of $I_q$, respectively. Since $\theta'_1=\theta'_\ominus$ in the quasi-polar domain, $r'_1$ must equal $r'_\ominus$; in practice; however, this is not guaranteed when using automatic endpoint initialization. Therefore, if $r'_1 \ne r'_\ominus$, both endpoints were set equal to $(r'_1,\theta'_1)$ and found the corresponding minimum-weighted path $p_1$. Next, both endpoints were set equal to $(r'_\ominus,\theta'_\ominus)$ and found the path $p_\ominus$. The ultimate selected path p (FIG. 6(f), designated 602) was the one that passed through the brighter overall path, where:

$$p = \begin{cases} p_1, & \text{if } \sum_{i=1}^{\ominus} I_q(p_1(\theta'_i), \theta'_i) \le \sum_{i=1}^{\ominus} I_q(p_\ominus(\theta'_i), \theta'_i) \\ p_\ominus, & \text{otherwise} \end{cases} \quad (11)$$

Cell Transformation Back into the Cartesian Domain

The segmentation $r'=p(\theta')$ was transformed back into the Cartesian domain (FIG. 6(g)). However, since the cell was segmented using only a cropped section of the image, the coordinates of the segmented layer were shifted back to its appropriate location on the original-sized image $\in \Re^{1024 \times 1024}$. The result was a binary edge image $E_c \in \Re^{1024 \times 1024}$, where all pixels $\{z_m\}_{m=1}^{\ominus}$ coincided with the segmentation such that $E_c(z_m)=1$. For all pixels $z_m$ and $z_{m+1}$ that were unconnected, linear interpolation was used to connect the dots and create a closed-contour.

Iteration for all Cells

To segment all other cells, the steps outlined herein for all pilot estimates of the cells in the image. To prevent gaps from occurring between adjacent cells, a preference was created for already-segmented cell borders by brightening their intensity values, where $I_c(z)=\max(I_c(z),\text{mean}(I_c)+1.5 \cdot \text{std}(I_c))$ and $T(z)=1$ for all z where $E_c(z)=1$.

Refinement

A suitable segmentation technique was used to separate cells by drawing a line through the middle of the cell border with a single pixel thickness. This section describes example post-processing steps that may be used to match automatic segmentation, and to remove any erroneous cell segmentations.

First, all cells smaller than 50 pixels were removed by setting $E_c(z)=1$ for all z lying within the cell. Then, the skeleton of $E_c$ was generated, and all spurs were removed. Next, at individual cell edges were reviewed by setting the branch points in $E_c$ equal to zero. The minimum edge threshold was defined to be $t=\text{mean}(I_c(Z_E))$ 1.5 $\text{std}(I_c(-Z_E))$, where $z_E$ was the set of all pixels where $E_c(z)=1$. If all pixels for a given cell edge fell below t, or if 80% of the pixels fell below t and there were at least 15 such pixels, then the cell edge was removed from $E_c$. Once all invalid cell edges were removed, all branch points on E were restored, and any newly created spurs or pixels no longer connected to the cell edge were removed.

Experimental Results

RPE Cell Segmentation Results

To validate our fully automatic segmentation results, the cell count and mean cell size for each of the 23 images were compared. To prevent from biasing results, these images were not used during algorithm development stage. Instead, a single confocal microscopy fluorescence image of an AMD mouse model not included in the validation dataset was used to train the algorithm.

Data from the comparison study (also referred to herein as "Gold Standard") was not altered in any shape or form, with one slight exception. Particularly, closed-counter features smaller than 100 pixels were absorbed into the neighboring cells, since such regions were likely a result of incorrect manual segmentation. In the replication of the results from the comparison study, these regions were discarded from our quantitative comparison since such regions were negligible. In the comparison study, regions of the image considered invalid due to imaging errors, flat-mount preparation errors, or cells being cut off by image borders, were marked separately and discarded from the analysis. In the present study, the markings from the comparison study were used to ignore the exact same invalid regions in our analysis. Note that, the above two types of outliers occupied a very small percentage of the total area segmented.

Figures 7, 8:
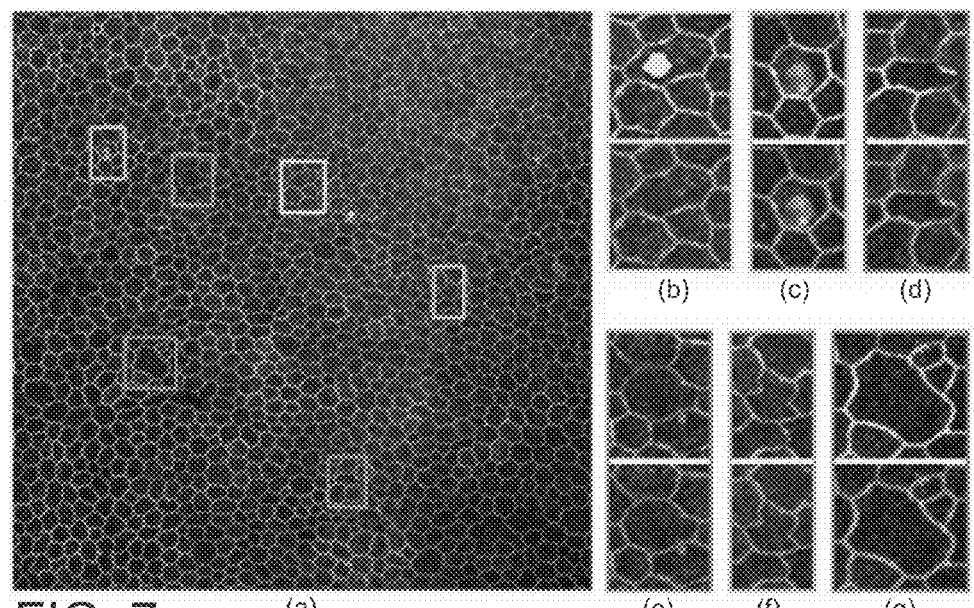
FIG. 7 shows qualitative results for a validation study.
FIG. 8 shows two confocal images of RPE cells along with their Gold Standard and automatic segmentation results.

Quantitative results for the RPE cell segmentation algorithm described in herein are shown in Table 1. The average error between automatic segmentation and the gold standard was 1.49±1.44% for the cell count and 1.32±1.53% for the mean cell area. The median error was found to be 0.97% and 0.71% for the detected number of cells and mean cell area, respectively. Qualitative results for this validation study are shown in FIG. 7, where FIG. 7(a) (corresponding to Image 16 in Table 1) is the automatically segmented confocal fluorescence image of an AMD flat-mounted mouse retina, and FIG. 7(b-g) are zoomed-in cell segmentation results. The cell borders may still be segmented in cases when (b) the pilot estimate (designated by line 700) was off-center and not a close estimate of the cell, (c) image artifacts or extraneous features were present, (d) the reflectivity of the cell border varied, (e) the cell had a low signal-to-noise ratio, (f) the cell was of abnormal shape, and (g) cell sizes were large or small.

FIG. 8 shows two confocal images of RPE cells (FIG. 8(a,d)) along with their Gold Standard (FIG. 8(b,e)) and automatic (FIG. 8(c,f)) segmentation results. The image shown in FIG. 8(a-c) corresponds to Image 9 in Table 1 with approximately median error, and FIG. 8(d-f) shows Image 10 from Table 1 with maximum error. FIG. 8(a,d) shows confocal fluorescence microscopy images of flat-mounted mouse retina. FIG. 8(b,e) shows Gold Standard segmentation of RPE cells (magenta) obtained semi-automatically using an independent technique. FIG. 8(c,f) shows fully automatic segmentation using the presented closed-contour GTDP technique. For the gold standard, cells bordering the image and invalid regions due to folding of tissue during preparation and imaging artifacts were ignored. These regions were therefore discarded FIG. 8(a-f, black borders) for the comparison study shown in Table 1.

Figure 9:
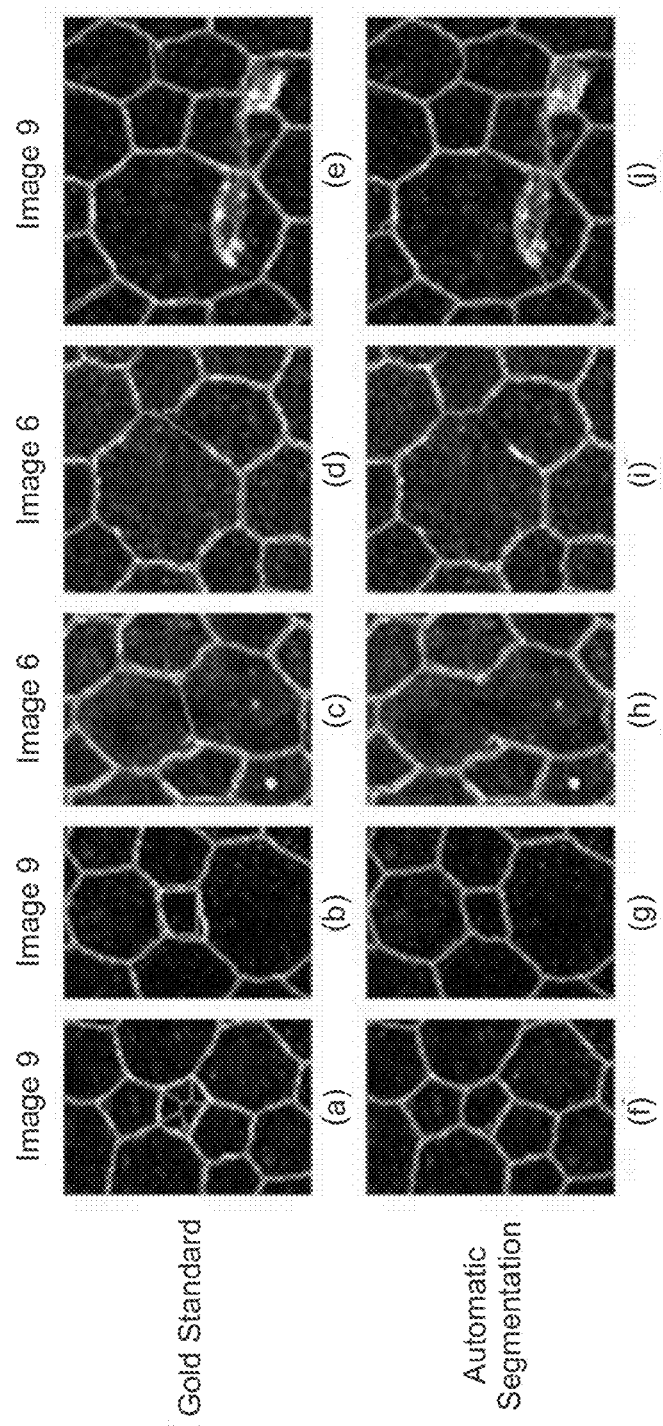
FIG. 9 shows zoomed-in images of Images 6 and 9 from Table 1 comparing the Gold Standard to automatic segmentation.

Lastly, FIG. 9 shows zoomed-in images of Images 6 and 9 from Table 1 comparing the Gold Standard (FIG. 9(a-e)) to automatic segmentation (FIG. 9(f-j)). The images in FIG. 9(a-c) are examples of erroneous gold standard segmentation, while FIG. 9(j) is an example of erroneous automatic segmentation. Their corresponding images (FIG. 9(e-h)) are examples of accurate segmentation. Finally, FIG. 9(d,i) shows an undetermined case where it is unclear which segmentation is correct. Particularly, FIG. 9 shows a zoomed-in comparison of fully automatic segmentation versus the gold standard. FIG. 9(a) shows erroneous gold standard segmentation: The small middle cell was merged with adjacent cells. FIG. 9(b) shows erroneous gold standard segmentation that did not significantly alter quantitative comparison: Although the middle cell was incorrectly shifted, the cell count remained correct. FIG. 9(c) shows erroneous gold standard segmentation: An enlarged diseased cell was incorrectly separated into two cells. It is emphasized that such errors (a-c) were very infrequent in the gold standard dataset consisting of thousands of semi-automatically segmented cells. However, existence of even a handful of such errors shows the limitation of subjective segmentation techniques relative to the automatic segmentation (f-h). FIG. 9(d,i) shows an undetermined case: The gold standard (d) delineated two separate cells, while the automatic segmentation (i) grouped them as a single cell. Since these are diseased RPE cells, it is unclear whether cells with a partially disappeared cell border should be considered individually or as a unit. FIG. 9(j) shows erroneous automatic segmentation: Borders were incorrectly drawn through the cells due to an artifact. FIG. 9(e-h) shows accurate gold standard (e) and automatic (f-h) segmentation.

The "single click" algorithm was coded in MATLAB (The MathWorks, Natick, Mass.) and resulted in an average computation time of 2.95 minutes per image (with an average of 964 cells per image) on a desktop computer with a 64-bit operating system, Core i7 2600K CPU (Intel, Mountain View, Calif.), solid state hard drive, and 16 GB of RAM. This time included the overhead required for reading and writing operations.

Segmentation Results for Other Applications

Figure 10:
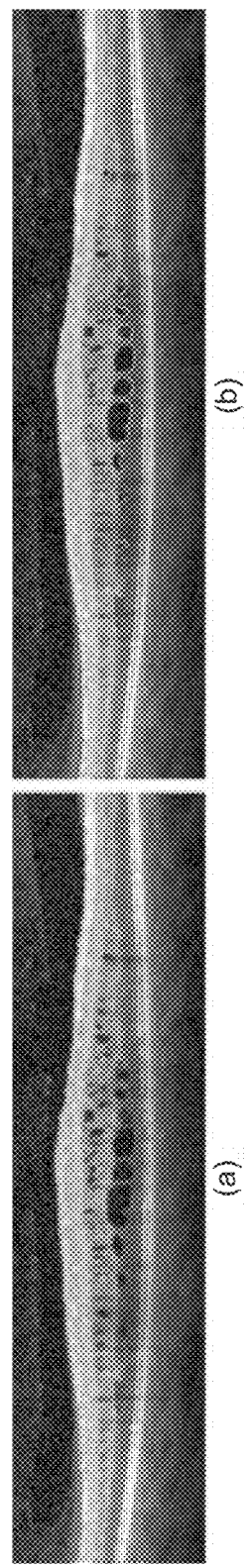
FIG. 10($a$) shows an SDOCT retinal image of a patient with DME.

Methods and systems in accordance with the present disclosure can be used to segment other ophthalmic features. These include intra-retinal cysts seen on SDOCT images (Spectralis; Heidelberg Engineering, Heidelberg, Germany) of patients with DME (FIG. 10). FIG. 10(a) shows an SDOCT retinal image of a patient with DME. FIG. 10(b) shows an image of fully automatically segmented retinal layers via layer GTDP, and segmented intra-retinal cysts via closed-contour GTDP.

Figure 11:
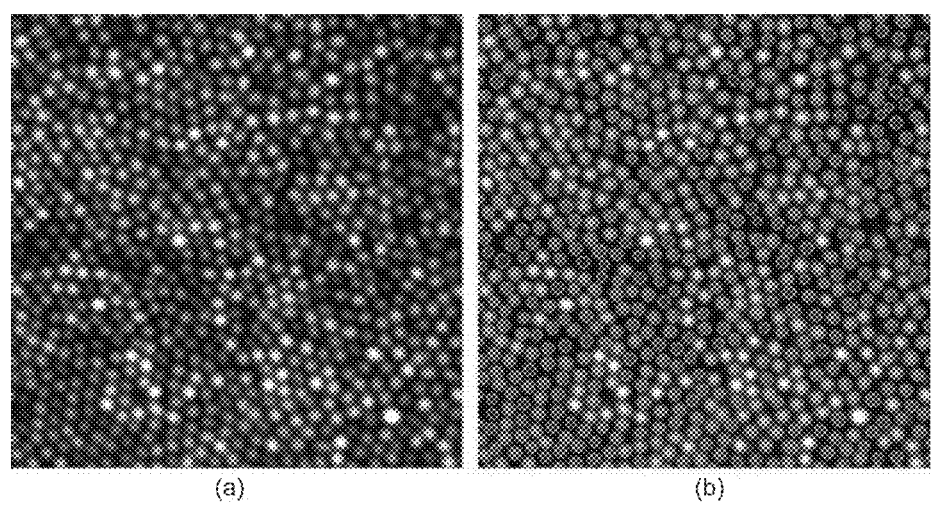
FIG. 11 shows AOSO images of cone photoreceptors of the retina.

In addition, the systems and methods disclosed herein may be used for automatic segmentation of cone photoreceptors on AOSO images of the retina (See e.g., FIG. 11). To segment the cysts and photoreceptors, the same basic framework as described herein may be utilized. Changes for adapting the algorithm to different image types included a modification of image filters and pilot estimation techniques, changing the edge weights, and different refinement steps to exclude erroneous segmentation (e.g., removing segmentations of hypo-reflective blood vessels in SDOCT images).

Table 1 below provides a comparison of the RPE cell count and average cell area obtained for each confocal fluorescence microscopy image via fully automatic segmentation versus the gold standard.

TABLE 1

Comparison

| Image | Number of Cells | | | Mean Cell Area | | |
|---|---|---|---|---|---|---|
| | Gold Standard (n) | Automatic (n) | Error (%) | Gold Standard (pixels) | Automatic (pixels) | Error (%) |
| 1 | 885 | 855 | 3.39 | 1003 | 1036 | 3.27 |
| 2 | 710 | 721 | 1.55 | 1228 | 1204 | 1.97 |
| 3 | 829 | 830 | 0.12 | 1087 | 1082 | 0.47 |
| 4 | 776 | 775 | 0.13 | 1126 | 1124 | 0.23 |
| 5 | 825 | 817 | 0.97 | 1092 | 1100 | 0.71 |
| 6 | 923 | 902 | 2.28 | 866 | 882 | 1.83 |
| 7 | 981 | 937 | 4.49 | 899 | 940 | 4.53 |
| 8 | 971 | 960 | 1.13 | 875 | 881 | 0.72 |
| 9 | 1097 | 1088 | 0.82 | 832 | 836 | 0.52 |
| 10 | 1253 | 1181 | 5.75 | 715 | 757 | 5.94 |
| 11 | 1187 | 1170 | 1.43 | 771 | 781 | 1.24 |
| 12 | 833 | 828 | 0.60 | 1062 | 1065 | 0.21 |
| 13 | 900 | 895 | 0.56 | 1007 | 1010 | 0.23 |
| 14 | 1235 | 1220 | 1.21 | 730 | 736 | 0.89 |
| 15 | 1005 | 999 | 0.60 | 892 | 895 | 0.32 |
| 16 | 1109 | 1075 | 3.07 | 815 | 839 | 2.96 |
| 17 | 1084 | 1077 | 0.65 | 836 | 840 | 0.37 |
| 18 | 1003 | 982 | 2.09 | 916 | 934 | 1.93 |
| 19 | 1013 | 1008 | 0.49 | 865 | 866 | 0.11 |
| 20 | 1054 | 1042 | 1.14 | 856 | 863 | 0.90 |
| 21 | 931 | 927 | 0.43 | 970 | 972 | 0.16 |
| 22 | 973 | 967 | 0.62 | 931 | 935 | 0.36 |
| 23 | 919 | 912 | 0.76 | 964 | 969 | 0.45 |
| Median | 973 | 960 | 0.97 | 899 | 934 | 0.71 |
| Mean | 978 | 964 | 1.49 | 928 | 937 | 1.32 |
| Std | 141 | 132 | 1.44 | 130 | 123 | 1.53 |

Systems and methods disclosed herein can provide for fully automatically segmenting confocal fluorescence images of RPE cells. For example, the qualitative results shown in FIG. 7 demonstrate accurate automatic cell segmentation despite the presence of image artifacts, low signal-to-noise ratio, or inaccurate estimations. Furthermore, the cell shape and size were not constraining factors for the presented automatic algorithm.

Quantitative results show that our fully automatic algorithm accurately segmented RPE cells on confocal images of flat-mounted mouse retina with AMD, yielding cell count and mean cell area measurements with an average error of less than 1.5%. Automatic segmentation errors similar to FIG. 9(j) occurred due to the presence of bright imaging artifacts, which erroneously altered values in the first cost function of Eq. (6). However, as shown in FIG. 6(a-c), even the gold standard segmentation reported in PNAS contained errors as well. Such errors may naturally occur in most manual or semi-automatic segmentation tasks required for large-scale studies, where multiple human experts subjectively grade images at different dates. Furthermore, since manual correction is extremely time consuming, cells with inconsequential errors (FIG. 9(b)) may not have been a priority to correct. As a result, a 0% error from the Gold Standard does not imply perfect segmentation.

To further reduce the effect of pilot estimation and achieve more accurate segmentation, one may employ an iterative approach, in which the result of segmentation for one iteration is used as the pilot estimate for the next iteration. In addition, application of modern adaptive denoising methods to raw images, which remove imaging artifacts without altering the anatomic structures, may further improve the automated segmentation performance.

A motivation for using cell count and area as validation metrics stems from the need to quantify the extent of cell damage present in different groups of diseased mice. While error in the absolute position of each automatically segmented cell may have been a more direct validation metric, the presence of errors in the gold standard made this unfeasible. Furthermore, the cell boundary is several pixels thick, making it difficult to assign a "true" boundary position. While the gold standard divided cells often through the middle of the cell border, this was not always the case. As a result, cell count and area are deemed to be a more meaningful and viable validation metric.

Finally, preliminary results are shown that demonstrate the segmentation of cysts seen in SDOCT images of eyes with DME (FIG. 10) and cone photoreceptors seen in AOSO images of the retina (FIG. 11). Prior studies on retinal fluid segmentation have focused on the detection of larger regions of intra-retinal fluid or fluid constrained by retinal layer segmentation. However, systems and methods disclosed herein may be sensitive to the small changes in intra-retinal fluid buildup.

Automatic Cone Photoreceptor Segmentation Using GTDP

Geometrical analysis of the photoreceptor mosaic can reveal subclinical ocular pathologies. In accordance with embodiments of the present disclosure, systems and methods provide a fully automatic algorithm to identify and segment photoreceptors in adaptive optics ophthalmoscope images of the photoreceptor mosaic. The performance of the algorithm was validated by comparing it to the state-of-the-art technique on a large dataset consisting of over 200,000 cones and posted the results online. It was found that the GTDP method achieved a higher detection rate, decreasing the cone miss rate by over a factor of five.

Diagnosis, prognosis, and treatment of many ocular and neurodegenerative diseases require visualization of microscopic structures in the eye. Integration of adaptive optics (AO) into ocular imaging systems has made the visualization of living human photoreceptors possible. More specifically, the AO scanning light ophthalmoscope (AOSLO) has been a key instrument for analyzing the photoreceptor mosaic and revealing subclinical ocular pathologies missed by other modern ophthalmic imaging modalities. Studies have been conducted on the photoreceptor mosaic to gather normative data on photoreceptor distribution, density, spacing, directionality, and temporal changes. Characterization of irregular mosaics in the presence of various retinal diseases such as cone-rod dystrophy has also been achieved.

To generate quantitative metrics of the photoreceptor mosaic, identification of individual photoreceptors is often a required step. Since manual identification is extremely time-consuming, many groups have utilized some form of automation when studying the photoreceptor mosaic. Cone identification algorithms have also been developed and validated for accuracy.

Herein, GTDP may be used to both identify and segment cone photoreceptors in AO ophthalmoscopy images, as disclosed herein. Performance was validated for cone identification. Further, its reproducibility was evaluated in cone density and spacing estimation. Further, the algorithm is extended to segment an image containing both rod and cone photoreceptors, as disclosed herein.

Image Dataset

The algorithm was validated on 840 images (150×150 pixels) from the one study, where the methods for image acquisition and pre-processing are described in detail. To summarize, the right eye of 21 subjects (25.9±6.5 years in age, 1 subject with deuteranopia) was imaged using a previously described AOSLO system with a 775 nm super luminescent diode and a 0.96×0.96° field of view. Four locations 0.65° from the center of fixation (bottom left, bottom right, top left, and top right) were imaged, capturing 150 frames at each site. This process was repeated 10 times for each subject. Axial length measurements were also acquired with an IOL Master (Carl Zeiss Meditec, Dublin, Calif.) to determine the lateral resolution of the captured images.

Following image acquisition, pre-processing steps were taken in the study to generate a single registered image from each 150 image sequence. To do this, first any sinusoidal distortions from the resonant scanner were removed from individual frames. The frames from each sequence were then registered to a reference frame], and the top 40 frames with the highest normalized cross correlation to the reference were averaged together. This procedure was performed for all 21 subjects at each of the 4 locations and repeated 10 times over, resulting in a total of 840 images in the image dataset. Finally, to ensure that each set of 10 repeated images captured the same patch of retina, the images were aligned using strip registration.

Since the image dataset was used strictly for algorithm validation, a separate set of images was obtained to tune the algorithm. These training images were captured using the same imaging protocol, and patients from the test and validation datasets did not overlap.

Gold Standard for Cone Identification

As described in the study, the initial cone coordinates were first automatically generated. Any missed cones were then added manually. Automatically segmented cones were not removed or adjusted.

GTDP Cone Segmentation Algorithm

In accordance with embodiments of the present disclosure, systems and methods described herein provide a GTDP framework for closed contour structures to segment cone photoreceptors in AOSLO images. Maxima operators were used to obtain pilot estimates of prominent cones. Then, a quasi-polar transform was used to map the closed contour cone estimates from the Cartesian domain into layers in the quasi-polar domain. The layered structures were then segmented utilizing a GTDP method. By applying the inverse quasi-polar transform, the segmentation lines were carried back into the Cartesian space. Finally, additional iterations were performed to find any missed cones. These steps are described in further detail below.

Initially, dim photoreceptors were brightened by applying Eq. (10) to the 150×150 pixel image $I_c^{orig}$ (subscript c denotes the Cartesian domain), where normalize(X, y, z) indicates a linear normalization of the elements in matrix X to range from y to z.

$$I_c^{all} = \text{normalize}(\log(\text{normalize}(I_c^{orig}, 0.1, 0.9)), 0, 1) \quad (10)$$

The range 0.1 to 0.9 was chosen to increase the contrast between the dimmest and brightest pixels, as well as to avoid the log(0) and log(1) computations. The superscript all means all pixels were present in the image.

Then, pilot estimates of the cones were determined by finding local maxima using the imregionalmax($I_c^{all}$,4) function in MATLAB, The MathWorks, Natick, Mass. This resulted in the binary image $B_c^{all}$, where values of 1 corresponded to pilot estimates of cones. Individual cones were then analyzed by order of decreasing intensity, where $I_c^{all}$ and $B_c^{all}$ were cropped about the centroid of the cone's pilot estimate to generate the 21×21 pixel images $I_c$ and $B_c$; cropping the images enabled a faster computation time, and the ten pixel buffer on all sides of the centroid ensured that the target cone was not cropped out of $I_c$. Pilot estimates for other cones contained within $B_c$ were removed, and the remaining cone estimate in $B_c$ was refined using thresholding. The new pilot estimate consisted of connected pixels in $I_c$ ranging from 0.95 $T_{max}$ to $T_{max}$ in intensity, where $T_{max}$ was the maximum intensity in $I_c$ that coincided with $B_c=1$, and 0.95 $T_{max}$ was determined empirically to avoid thresholding adjacent cones.

Figure 12:
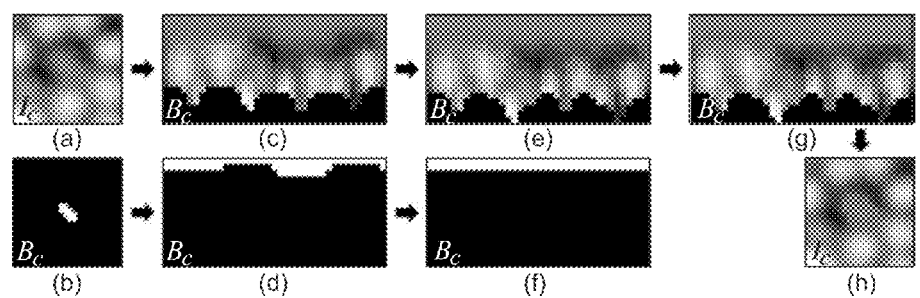
FIG. 12($a$) shows a Cartesian image containing the cone to segment.

To segment each cone, a quasi-polar transform was used to transform $I_c$ to $I_q$ (q denotes the quasi-polar domain). FIG. 12(a) shows a Cartesian image containing the cone to segment. FIG. 12(b) shows an image of a pilot estimate of the cone in FIG. 12(a). FIGS. 12(c,d) show polar transformation of (a) and (b), respectively. The black regions in (c) are invalid points that lie outside the image in the Cartesian domain. FIGS. 12(e,f) show images (c) and (d) column-wise shifted until the pilot estimate in (d) was flat. FIG. 12(g)

shows an image of segmentation of (e) using GTDP. FIG. 12(h) Transformation of the segmentation in (g) back into the Cartesian domain.

Referring to FIG. 12, first $I_c$ and $B_c$ (FIGS. 12(a) and 12(b)) were transformed into the polar domain to create $I_p$ and $B_p$ (FIGS. 12(c) and 12(d)). Next, $I_p$ was column-wise shifted until the pilot estimate in $B_p$ was flat, resulting in the quasi-polar images $I_q$ and $B_q$ (FIGS. 12(e) and 12(f)). After obtaining $I_q$, regions containing other pilot estimates were removed, and already-segmented cones were removed from the search space, and GTDP was used to find the shortest path across $I_q$ with the following weight scheme:

$$w_{ab}=\text{normalize}(-(g_a^{LD}+g_b^{LD}),1,2)+\text{normalize}(-(g_a^{DL}+g_b^{DL}),0, 0.1)+\text{normalize}(d_{ab}, 0, 0.05)+w_{min}, \quad (11)$$

where $w_{ab}$ is the edge weight connecting nodes a and b, $g_n^{LD}$ and $g_n^{DL}$ are the vertical light-to-dark and dark-to-light gradients of the image at node n, respectively, $d_{ab}$ is the Euclidian distance from node a to b, and $w_{min}=0.00001$. The vertical light-dark gradient comprised the majority of the weight, since it was the primary indicator for the boundary of the central cone. A smaller weight was given to the dark-light gradient to segment boundaries of dimmer cones adjacent to brighter cones (FIG. 12(c), left). Finally, a vertical distance penalty was added to discourage the segmented line from including adjacent cones. Specific values for weight ranges were determined empirically.

Then, the shortest path was transformed from the quasi-polar domain (FIG. 12(g)) back into the Cartesian domain to obtain the final segmentation of the cone (FIG. 12(h)), keeping it only if the mean radius was greater than one pixel. This entire process was then repeated for all subsequent cone estimates.

At this stage of the algorithm, the cones identified and segmented by the GTDP method (FIG. 13(b), black) may be similar to those detected by previous methods, since local maxima were used to initialize the cone locations. To further identify any missed cones, we obtained pilot estimates of the cones using a second method: image deblurring using maximum likelihood blind deconvolution (deconvblind function in MATLAB) with a Gaussian point spread function of half the mean radius of already segmented cones, followed by locating all regional maxima with a pixel connectivity of eight. Any pilot estimates lying outside already-segmented cone locations (FIGS. 13(a) and 13(b), white) were segmented using the same quasi-polar GTDP technique, with the modification to the weighting matrix as shown in Eq. (12). In this weighting scheme, the vertical dark-light gradient was assigned a higher weight since cones detected during this section iteration were typically dimmer and adjacent to brighter cones. The vertical distance penalty was also removed since adjacent cones were already segmented and thus removed from the search region.

$$w_{ab}=\text{normalize}(-(g_a^{LD}+g_b^{LD}), 1, 2)+\text{normalize}(-(g_a^{DL}+g_b^{DL}), 1, 1.5)+w_{min} \quad (12)$$

Figure 13:
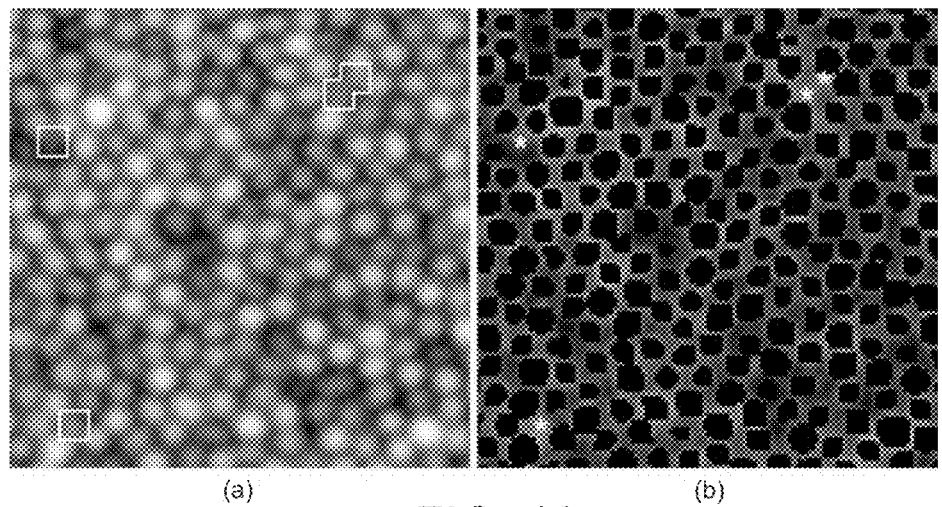
FIG. 13 shows images of identification of cones missed by local maxima.

FIG. 13 shows images of identification of cones missed by local maxima. Particularly, FIG. 13(a) shows an AOSLO image in log scale with missed cones shown inside the white boxes. FIG. 13(b) shows an image of cone photoreceptors segmented using local maxima initialization in black, and pilot estimates of missed cones found using deconvolution and local maxima are shown in white asterisks.

Statistical Validation

A GTDP algorithm was validated by comparing its performance to an algorithm used in a study and to the Gold Standard. To perfectly replicate one study, all images were cropped to a 55 μm×55 μm region about the image center to remove any boundary effects.

To evaluate the performance in cone identification, both fully automatic methods (GTDP and a Garrioch study) to the Gold Standard using two metrics: # of true positives, those detected by both the fully automatic and gold standard techniques, and # of false positives, those detected by the fully automatic method but not by the gold standard. A cone was considered to be a true positive if it was within a 1.75 μm Euclidian distance from a Gold Standard cone. This value was chosen since the mean cone spacing reported in the Garrioch study was approximately 3.50 μm; half this value was therefore a reasonable estimate for the cone radius. If an automatically identified cone did not have any gold standard cones within the 1.75 μm distance, then it was tagged as a false positive. Furthermore, more than one automatically identified cone could not be matched to a single gold standard cone, thus yielding the following relationships:

$$N_{automatic\ cones\ identified}=N_{true\ positive}+N_{false\ positive}$$

and $$N_{gold\ standard\ cones\ identified}=N_{true\ positive}+N_{false\ positive}, \quad (13)$$

where $N_{false\ negative}$ was the number of cones detected by the gold standard but not by the fully automatic method. The proportion of true and false positives were then estimated with 95% confidence intervals (CI) across all patients and all quadrants using a generalized estimating equation (GEE) model with log link.

The reproducibility of each method was assessed by the comparing cone density (number of cones per $mm^2$) and cone spacing (mean distance from each cone to its nearest neighbor) measurements output by each method at each quadrant. The variability in cone density and spacing measurements (characterized by the variance $v_{total}$) stemmed from two sources: 1) variability in measurements taken on the same subject, resulting from the method used (within-subject variability; variance $v_{within}$), and 2) variability in true values between subjects, resulting from biological variation between subjects (between-subjects variability; variance $v_{between}$). Thus, $v_{total}=V_{within}+V_{between}$. The reproducibility was characterized using two components: 1) within-subject coefficient of variation (CV), and 2) intra-class (intra-subject) correlation coefficient (ICC). The within-subject CV was defined as the ratio of the square root of $V_{within}$ to the overall mean measurement, where a lower CV indicates a better the method. ICC was defined as the ratio of $v_{between}$ to $V_{total}$, thus a ratio closer to 1 indicates a better method.

Preliminary GTDP Rod-Cone Segmentation Algorithm

To illustrate the potential of this algorithm to segment images containing both rods and cones, the cone segmentation algorithm described herein was modified to segment a rod and cone photoreceptor image (originally 250×250 pixels, scaled to 578×578 pixels at 0.186 μm/pixel) captured using the new generation of AOSLO systems. In this modified embodiment of the algorithm, photoreceptors were segmented with weights determined by Eq. (14), where $i_n$ is the intensity of the image at node n, and $r_n$ is the distance of node n from the top of the image $I_q$. These additional weights were included to target the location of minimum intensity rather than maximum gradient, and to penalize peripheral photoreceptors from being segmented.

$$w_{ab}=\text{normalize}(-(g_a^{LD}+g_b^{LD}), 1, 2)+\text{normalize}(i_a+i_b, 0.1, 0.2)+\text{normalize}(r_a+r_b, 0, 0.05)+\text{normalize}(d_{ab}, 2, 2.1)+w_{min} \quad (14)$$

Segmentations with radii less than 3.72 µm were considered to isolate rods, and the rest were re-segmented with the weighting scheme in Eq. (15) to isolate cones. The $r_n$ distance penalty was removed since cones have larger radii than rods, and the $g_n^{LD}$ weights were removed to delineate the prominent hypo-reflective region surrounding cones on AOSLO rather than the high gradient boundary.

$$w_{ab} = \text{normalize}(i_a + i_b, 0.2, 1) + \text{normalize}(d_{ab}, 0, 0.1) + w_{min} \quad (15)$$

Cone Segmentation Result

Figure 14:
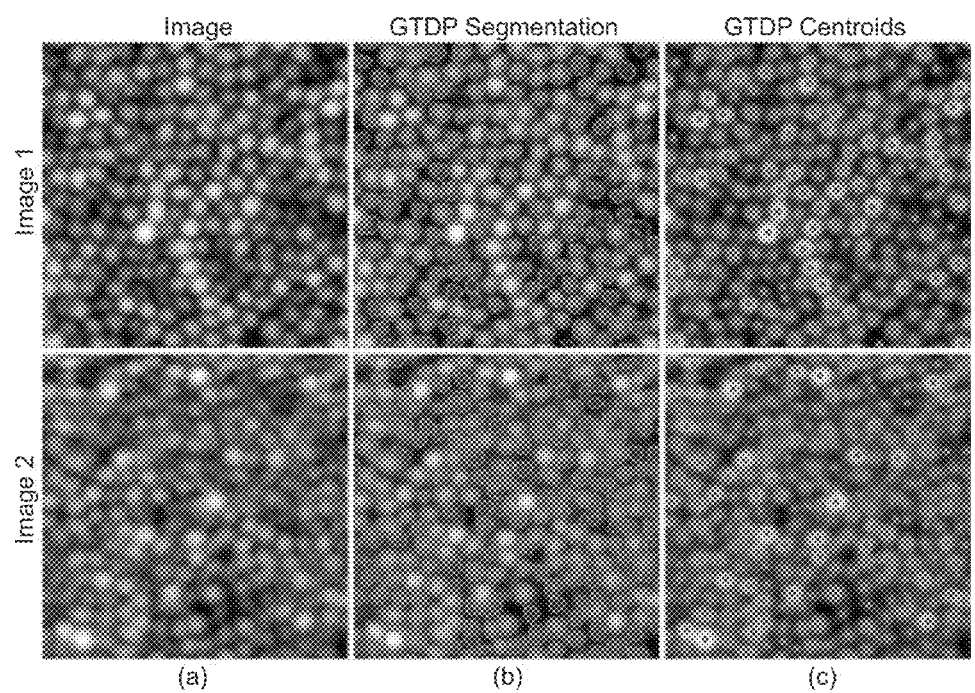
FIG. 14 shows different images of segmentation results.

FIG. 14(b) (top) is a representative segmentation result generated by our GTDP algorithm to segment cone photoreceptors in AOSLO images, and FIG. 14(c) (top) shows the centroid of each segmented cell. While the GTDP algorithm delineated the perceived cone boundaries, we used the result in FIG. 3(c) to validate our algorithm against other cone identification techniques. FIG. 14 (bottom) shows the segmentation result for an image of lower quality.

Cone Identification Performance

The performance in cone identification for each of the methods is shown in Table 2 below. This table shows that after taking into consideration all correlated data, our GTDP method correctly detected 99.0% of the cones, compared to the Garrioch method which detected 94.5% of the gold standard cones; this difference was found to be significant (Z=15.0, p<0.0001). In addition, 1.5% of the cones found by the GTDP method were not in the Gold Standard. False positive cones could not be detected by the Garrioch method since the Gold Standard was based off of the Garrioch algorithm. Lastly, the mean distance error from the true positive GTDP cones to the gold standard cones was 0.20±0.26 µm.

Table 2 below shows cone identification performance of fully automatic methods compared to the gold standard across all 840 images.

TABLE 2

| | Cone | |
|---|---|---|
| Method | % True Positive (95% CI)* | % False positive (95% CI) |
| Garrioch et al. 2012 | 94.5 (93.7, 95.2) | — |
| GTDP | 99.0 (98.8, 99.2) | 1.5 (1.2, 1.9) |

*Statistically significant

Figure 15:
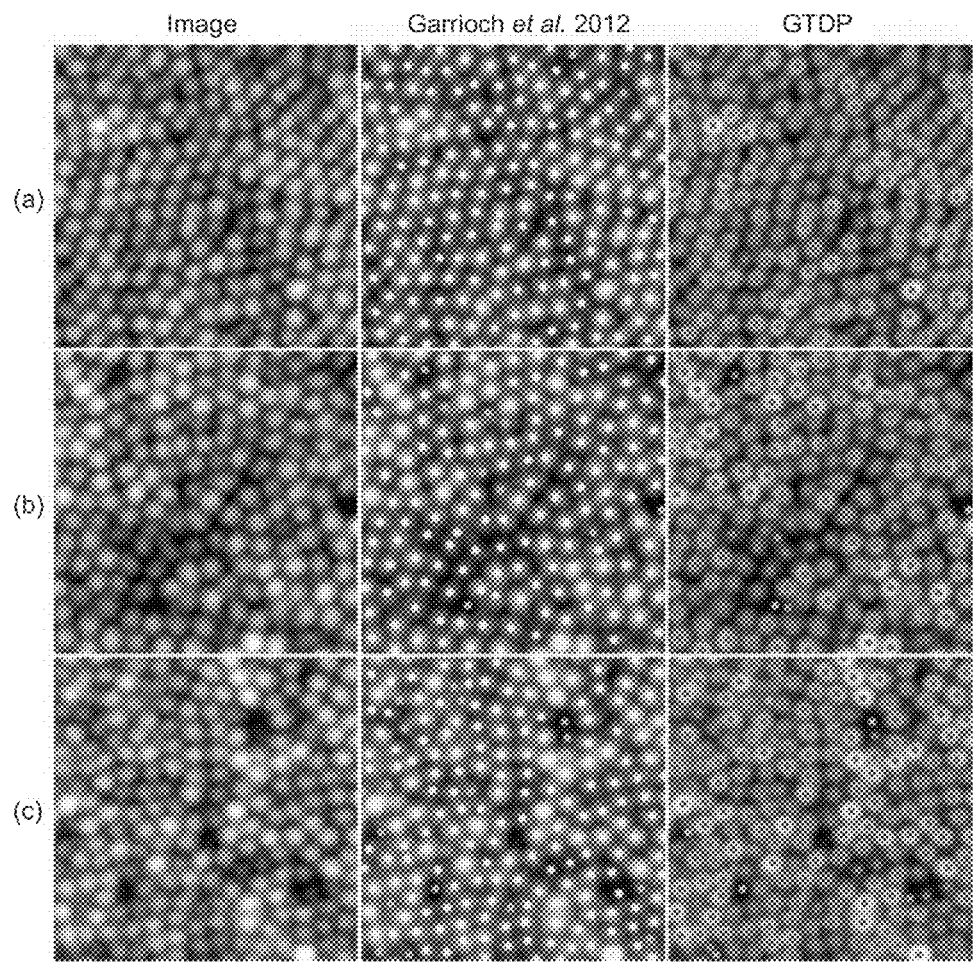
FIG. 15 is an illustrative example of the cone identification results, where the middle row shows the mean cone identification performance for both automatic algorithms, while the top and bottom rows show the performance approximately one standard deviation above and below the mean.

FIG. 15 is an illustrative example of the cone identification results, where the middle row shows the mean cone identification performance for both automatic algorithms, while the top and bottom rows show the performance approximately one standard deviation above and below the mean. The middle column displays the Garrioch algorithm results, with true positives in yellow and false negatives in green. The right column shows the GTDP results. The performance (% true positive by Garrioch; % true positive by GTDP; % false positive by GTDP) for the top, middle, and bottom rows of FIG. 15 were (100; 98.4; 0), (99.1; 94.4; 2.1), and (97.5; 90.4; 3), respectively.

Figure 16:
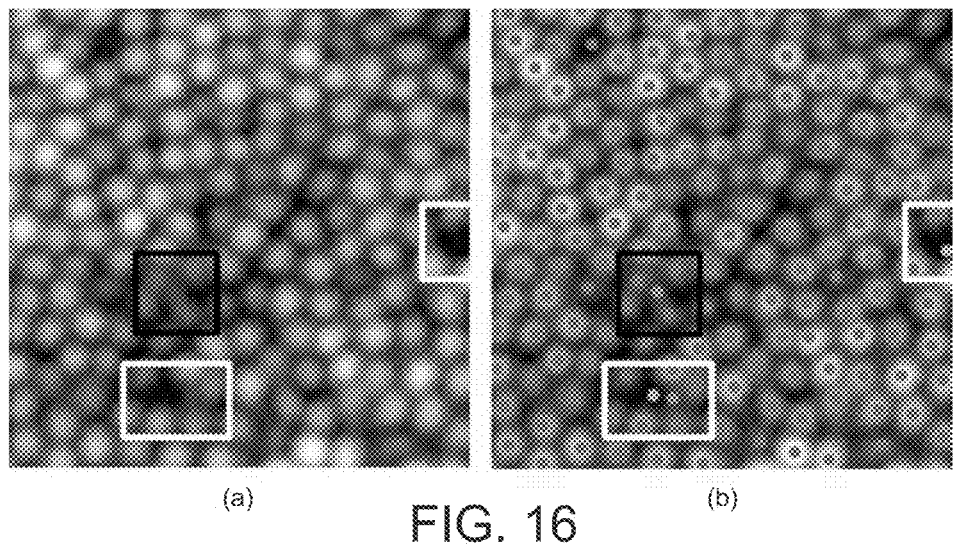
FIG. 16 shows images of the results from FIG. 15(b)

Finally, FIG. 16 takes a closer look at the results from FIG. 15(b) (right). The black box highlights a "false positive" cone added by the GTDP algorithm per the gold standard, however inspection of the original image in FIG. 16(a) indicates that a cone is indeed present at that location. In contrast, the white boxes in FIG. 16 highlight "false negative" cones missed by the algorithm per the gold standard. By inspecting FIG. 16(a), however, these locations do not seem to exhibit hyper reflectivity.

Reproducibility Results

Table 2 shows the mean, ICC, and within-subject CV values for the cone density and spacing metrics as measured by the Garrioch, GTDP, and Gold Standard methods separated by image quadrant. The average GTDP cone density ICC of 0.989 indicates that on average, 98.9% of the total variability in the measurements was due to the variability between subjects, while only 1.1% was due to the GTDP algorithm. The average GTDP within-subject CV of 0.0146 indicates that the error in reproducing the same measurement for the same subject was within 1.46% of the mean.

TABLE 3

Reproducibility comparison of cone density and spacing measurements
Preliminary Rod and Cone Segmentation Result

| | Cone Density | | | Cone Spacing | | |
|---|---|---|---|---|---|---|
| Fixation Location | Mean (cones/mm²) | ICC | Within-subject CV | Mean (µm) | ICC | Within-subject CV |
| Garrioch | | | | | | |
| Bottom left | 67,207 | 0.979 | 0.0217 | 3.50 | 0.989 | 0.0074 |
| Bottom right | 66,812 | 0.972 | 0.0253 | 3.50 | 0.983 | 0.0087 |
| Top left | 70,928 | 0.950 | 0.0272 | 3.37 | 0.975 | 0.0090 |
| Top right | 69,192 | 0.970 | 0.0273 | 3.39 | 0.984 | 0.0093 |
| Average | 68,534 | 0.968 | 0.0254 | 3.44 | 0.983 | 0.0086 |
| GTDP | | | | | | |
| Bottom left | 70,796 | 0.993 | 0.0121 | 3.42 | 0.978 | 0.0110 |
| Bottom right | 70,783 | 0.989 | 0.0149 | 3.40 | 0.964 | 0.0131 |
| Top left | 75,485 | 0.988 | 0.0133 | 3.28 | 0.960 | 0.0124 |
| Top right | 74,216 | 0.985 | 0.0181 | 3.29 | 0.957 | 0.0154 |
| Average | 72,820 | 0.989 | 0.0146 | 3.35 | 0.965 | 0.0130 |
| Gold standard | | | | | | |
| Bottom left | 70,577 | 0.995 | 0.0101 | 3.45 | 0.981 | 0.0097 |
| Bottom right | 70,204 | 0.994 | 0.0111 | 3.44 | 0.975 | 0.0106 |
| Top left | 75,416 | 0.994 | 0.0103 | 3.31 | 0.968 | 0.0113 |
| Top right | 73,914 | 0.995 | 0.0109 | 3.32 | 0.985 | 0.0090 |
| Average | 72,528 | 0.994 | 0.0106 | 3.38 | 0.977 | 0.0101 |

Figure 17:
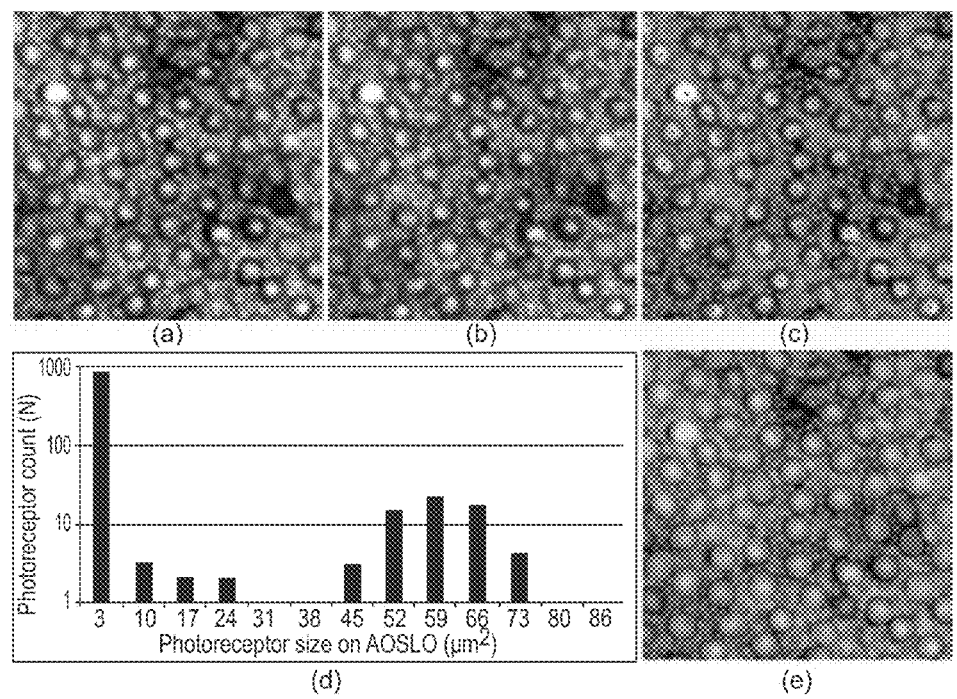
FIG. 17 shows images and histogram associated with rod and cone photoreceptor image.

FIG. 17(a) shows an example rod and cone photoreceptor image accompanied by the GTDP segmentation result in FIG. 6(b) and its associated centroids in FIG. 17(c). FIG. 17(d) shows a histogram of the number of photoreceptors at various sizes based on the segmentation from FIG. 16(b), and FIG. 17(e) demonstrates a simple classification of rod and cone photoreceptors using a size threshold of 27.7 µm².

In accordance with embodiments, disclosed herein is a fully automatic algorithm using graph theory and dynamic programming to segment cone photoreceptors in AOSLO images of the retina and validated its performance. The present disclosure provides a higher cone detection rate, more accurate cone density and spacing measurements, and comparable reproducibility compared to other techniques. Furthermore, the segmentation-based approach enabled identification and classification of rods and cones within a single image.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flow chart illustrations and/or block diagrams of methods, apparatus (systems), and computer program products according to embodiments of the subject matter. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the Figures illustrate the architecture, functionality, and operation of possible implementations of systems, methods, and computer program products according to various embodiments of the present subject matter. In this regard, each block in the flow chart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flow chart illustration, can be implemented by special purpose hardware-based systems that perform the specified functions or acts or carry out combinations of special purpose hardware and computer instructions.

Any patents or publications mentioned in this specification are indicative of the levels of those skilled in the art to which the present subject matter pertains. These patents and publications are herein incorporated by reference to the same extent as if each individual publication was specifically and individually indicated to be incorporated by reference.

One skilled in the art will readily appreciate that the present subject matter is well adapted to carry out the objects and obtain the ends and advantages mentioned, as well as those inherent therein. The present examples along with the methods described herein are presently representative of various embodiments, are exemplary, and are not intended as limitations on the scope of the present subject matter. Changes therein and other uses will occur to those skilled in the art which are encompassed within the spirit of the present subject matter as defined by the scope of the claims.

What is claimed is:

1. A method comprising:
   using at least one processor and memory for:
   representing, in a rectangular domain, an image including a feature of interest;
   using a maxima operator to determine a point within the feature of interest;
   transforming the image of the feature from the rectangular domain to a quasi-polar domain based on the point, the quasi-polar domain being represented as a graph of nodes connected together by edges; and
   graph cutting the quasi-polar domain to identify the boundary of the feature of interest in the image.

2. The method of claim 1, further comprising using the at least one processor and memory for estimating a boundary of the feature of interest.

3. The method of claim 2, wherein determining the point comprises determining the point within the estimated boundary of the feature of interest.

4. The method of claim 1, further comprising using the at least one processor and memory for:
   adding, to the graph, nodes adjacent to nodes along first and second sides of the graph, wherein the added nodes have edge weights less than the nodes along the first and second sides of the graph; and
   assigning start and end points to any of the added nodes along the first and second sides, respectively; and
   wherein graph cutting comprises graph cutting between the start and end points to identify the feature of interest in the image.

5. The method of claim 4, further comprising using the at least one processor and memory for shifting the nodes along the path to be flat.

6. The method of claim 4, further using the at least one processor and memory for comprising assigning the edge weights based on an accumulate gradient of nodes corresponding to the edges.

7. The method of claim 1, further comprising using the at least one processor and memory for:
   adding, to the graph, a first node and a second node adjacent to nodes along a first side and a second side, respectively, of the graph; and
   wherein graph cutting comprises graph cutting between the first and second nodes to identify the feature of interest in the image.

8. The method of claim 1, wherein the feature of interest is one of a closed-contour feature and a substantially closed-contour feature.

9. The method of claim 1, wherein the feature of interest is a retinal closed-contour feature.

10. The method of claim 1, wherein graph cutting comprises applying a shortest path algorithm to determine a minimum-weighted path across the graph between the start and end nodes, wherein the minimum-weighted path corresponds to the feature of interest.

11. The method of claim 1, further comprising using the at least one processor and memory for:
    filtering a digitized image of the feature of interest to generate a binary image; and
    manipulating the binary image using morphological operators to reduce or eliminate noise of artifacts in the binary image; and
    wherein transforming the image comprises transforming the binary image to the quasi-polar domain.

12. The method of claim 1, further comprising using the at least one processor and memory for shifting pixels on the transformed image until the feature of interest is substantially flat.

13. A computer-implemented system comprising:
    at least one processor and memory configured to:
    represent, in a rectangular domain, an image including a feature of interest;
    use a maxima operator to determine a point within the feature of interest;
    transform the image of the feature from the rectangular domain to a quasi-polar domain based on the point, the quasi-polar domain being represented as a graph of nodes connected together by edges; and
    graph cut the quasi-polar domain to identify the boundary of the feature of interest in the image.

14. The computer-implemented system of claim 13, wherein the at least one processor and memory are configured to estimate a boundary of the feature of interest.

15. The computer-implemented system of claim 14, wherein the at least one processor and memory are configured to determine the point within the estimated boundary of the feature of interest.

16. The computer-implemented system of claim 13, wherein the at least one processor and memory are configured to:
    add, to the graph, nodes adjacent to nodes along first and second sides of the graph, wherein the added nodes have edge weights less than the nodes along the first and second sides of the graph;
    assign start and end points to any of the added nodes along the first and second sides, respectively; and
    wherein graph cutting comprises graph cutting between the start and end points to identify the feature of interest in the image.

17. The computer-implemented system of claim 16, wherein the at least one processor and memory are configured to shift the nodes along the path to be flat.

18. The computer-implemented system of claim 16, wherein the at least one processor and memory are configured to assign the edge weights based on an accumulate gradient of nodes corresponding to the edges.

19. The computer-implemented system of claim 13, wherein the at least one processor and memory are configured to:
    add, to the graph, a first node and a second node adjacent to nodes along a first side and a second side, respectively, of the graph; and
    wherein graph cutting comprises graph cutting between the first and second nodes to identify the feature of interest in the image.

20. The computer-implemented system of claim 13, wherein the feature of interest is one of a closed-contour feature and a substantially closed-contour feature.

21. The computer-implemented system of claim 13, wherein the feature of interest is a retinal closed-contour feature.

22. The computer-implemented system of claim 13, wherein graph cutting comprises applying a shortest path algorithm to determine a minimum-weighted path across the graph between the start and end nodes, wherein the minimum-weighted path corresponds to the feature of interest.

23. The computer-implemented system of claim 13, wherein the at least one processor and memory are configured to:
    filter a digitized image of the feature of interest to generate a binary image; and manipulate the binary image using morphological operators to reduce or eliminate noise of artifacts in the binary image; and wherein transforming the image comprises transforming the binary image to the quasi-polar domain.

24. The computer-implemented system of claim 13, wherein the at least one processor and memory are configured to shift pixels on the transformed image until the feature of interest is substantially flat.

\* \* \* \* \*